United States Patent
Xue et al.

(10) Patent No.: US 10,880,844 B2
(45) Date of Patent: Dec. 29, 2020

(54) TRANSMISSION POWER DEPENDENT QUIET PERIODS FOR NR-U

(71) Applicant: QUALCOMM Incorporated, San Diego, CA (US)

(72) Inventors: Yisheng Xue, San Diego, CA (US); Aleksandar Damnjanovic, Del Mar, CA (US); Xiaoxia Zhang, San Diego, CA (US); Jing Sun, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/733,756

(22) Filed: Jan. 3, 2020

(65) Prior Publication Data

US 2020/0221392 A1 Jul. 9, 2020

Related U.S. Application Data

(60) Provisional application No. 62/789,793, filed on Jan. 8, 2019.

(51) Int. Cl.
*H04W 52/28* (2009.01)
*H04W 74/08* (2009.01)
*H04W 16/14* (2009.01)

(52) U.S. Cl.
CPC ......... *H04W 52/287* (2013.01); *H04W 16/14* (2013.01); *H04W 74/0816* (2013.01)

(58) Field of Classification Search
CPC ............... H04W 52/287; H04W 16/14; H04W 74/0816

(Continued)

(56) References Cited

U.S. PATENT DOCUMENTS

2003/0220117 A1* 11/2003 Duffett-Smith ........... G01S 5/10
455/456.6
2009/0213815 A1* 8/2009 Sherman ........... H04W 74/0841
370/336

(Continued)

FOREIGN PATENT DOCUMENTS

EP 3035763 A1 6/2016

OTHER PUBLICATIONS

International Search Report and Written Opinion—PCT/US2020/012386—ISA/EPO—Apr. 17, 2020.

(Continued)

*Primary Examiner* — Joel Ajayi
(74) *Attorney, Agent, or Firm* — Arent Fox LLP

(57) ABSTRACT

A periodic quiet interval is provided for base stations attempting to access a shared transmission medium in NR-U. The base station activates a quiet interval at a periodic interval and transmits on the medium based on the quiet interval. The base station may reduce a Tx power, not transmit, and/or may increase a minimum value of a contention window for BEB during the quiet interval. The base station may receive a request from a second base station to activate the quiet interval, and may determine if a Tx power of the base station is larger than the maximum Tx power of the second base station. The base station may also receive the request as relayed through a UE. The quiet interval can thus ameliorate a starvation effect of BEB in NR-U by allowing base stations with smaller Tx power greater opportunity to control the medium while maintaining BEB in NR-U.

20 Claims, 18 Drawing Sheets

(58) Field of Classification Search
USPC .......................................................... 455/454
See application file for complete search history.

(56) References Cited

U.S. PATENT DOCUMENTS

| | | | | |
|---|---|---|---|---|
| 2012/0246692 | A1* | 9/2012 | Ghosh | H04W 16/14 |
| | | | | 725/118 |
| 2013/0029606 | A1* | 1/2013 | Wang | H04W 48/18 |
| | | | | 455/62 |
| 2013/0315112 | A1* | 11/2013 | Gormley | H04W 16/14 |
| | | | | 370/280 |
| 2015/0016429 | A1* | 1/2015 | Menon | H04W 16/14 |
| | | | | 370/336 |
| 2016/0119899 | A1 | 4/2016 | Freda et al. | |

OTHER PUBLICATIONS

Zhou Lan (NICT): "Comment resolution #335 , 11-10-0902-00-00ad-comment-resolution-335", IEEE Draft, 11-10-0902-00-00AD-Comment-Resolution-335, IEEE-SA Mentor, Piscataway, NJ, USA, vol. 802 .11ad, Jul. 15, 2010 (Jul. 15, 2010), pp. 1-6, XP017676461, [retrieved on Jul. 15, 2010] section 7.3.2.61.

* cited by examiner

TRANSMISSION POWER DEPENDENT QUIET PERIODS FOR NR-U

CROSS REFERENCE TO RELATED APPLICATION(S)

This application claims the benefit of U.S. Provisional Application Ser. No. 62/789,793, entitled "TRANSMISSION POWER DEPENDENT QUIET PERIODS FOR NR-U" and filed on Jan. 8, 2019, which is expressly incorporated by reference herein in its entirety.

BACKGROUND

Technical Field

The present disclosure relates generally to communication systems, and more particularly, to a wireless communication system between base stations contending for access to a channel to serve user equipment in NR-U.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In the unlicensed spectrum for NR and LTE, technologies such as Licensed Assisted Access (LAA), enhanced-Licensed Assisted Access (eLAA) and Further Enhanced LAA (FeLAA) rely on binary exponential backoff (BEB) for contention window management when multiple devices (cellular or Wi-Fi) simultaneously attempt to access a shared transmission medium. However, while BEB has generally been adopted in 3GPP unlicensed solutions in part based on its use of easing coexistence with Wi-Fi systems and its longstanding deployment success in the Wi-Fi community, BEB can lead to starvation in heavily loaded asynchronous deployments. For example, where a first and second base station are contending for access to a shared, unlicensed transmission medium using carrier-sense multiple access with collision avoidance (CSMA/CA) in NR-U (or where one operator uses NR-U and the other uses Wi-Fi), and the first base station transmits downlink intensive communications to a UE at larger power than the second base station's maximum Tx power, starvation for user equipment (UEs) of the second base station can arise. While this starvation effect of BEB is not critical in Wi-Fi systems, it can be significant in NR-U systems since NR-U/LTE involves better quality of service (QoS) to contend with Wi-Fi in the unlicensed band. However, as energy-detection (ED) based CSMA/CA may be the mechanism in NR-U for Over-The-Air (OTA) coordination among different network/node operators, BEB is likely to remain a primary collision avoidance mechanism in NR-U. Hence, it is desirable to address this starvation effect in CSMA/CA-based channel access while maintaining BEB.

The present disclosure addresses this starvation effect by implementing a periodic quiet interval during which base stations with large transmission (Tx) powers reduce their power, do not transmit (e.g. keep quiet), or periodically increase the minimum slot duration timing of the BEB contention window (CWmin), when they are attempting to gain access to a transmission medium in NR-U. The base station may activate the quiet interval in response to an OTA Request from another base station having smaller Tx power, and may subsequently deactivate the quiet interval when no further OTA Requests are received. The present disclosure thus ameliorates the starvation effect by allowing smaller power base stations greater opportunity to control the medium with greater QoS while maintaining BEB in NR-U.

In an aspect of the disclosure, a method, a computer-readable medium, and an apparatus are provided of wireless communication at a base station (e.g. a base station with large Tx power). The base station activates a quiet interval at a periodic interval and transmits on a transmission medium based on the quiet interval. The base station may reduce a transmission power during the quiet interval, may not transmit during the quiet interval, and/or may increase a minimum value of a contention window for BEB associated with CSMA/CA. The base station may receive a request from a second base station to activate the quiet interval, where the request includes a maximum transmission power of the second base station; and may determine if a transmission power of the base station is larger than the maximum transmission power of the second base station, where the base station activates the quiet interval if the transmission power of the base station is larger than the maximum transmission power of the second base station. The base station may deactivate the quiet interval in the absence of receiving, within a period of time, a request indicating a smaller maximum transmission power than a transmission power of the base station.

In another aspect of the disclosure, a method, a computer-readable medium, and an apparatus are provided of wireless communication at a first base station (e.g. a base station with smaller Tx power). The first base station determines if a maximum transmission power of the first base station is smaller than a predetermined value; and transmits a request for a second base station to activate a quiet interval, where the request indicates the maximum transmission power of the first base station.

In a further aspect of the disclosure, a method, a computer-readable medium, and an apparatus are provided of wireless communication at a UE. The UE receives from a base station a request for a second base station to activate a quiet interval; and relays the request to the second base station.

To the accomplishment of the foregoing and related ends, the one or more aspects comprise the features hereinafter fully described and particularly pointed out in the claims. The following description and the annexed drawings set forth in detail illustrative features of the one or more aspects. These features are indicative, however, of but a few of the various ways in which the principles of various aspects may be employed, and this description is intended to include all such aspects and their equivalents.

DETAILED DESCRIPTION

Figure 1:
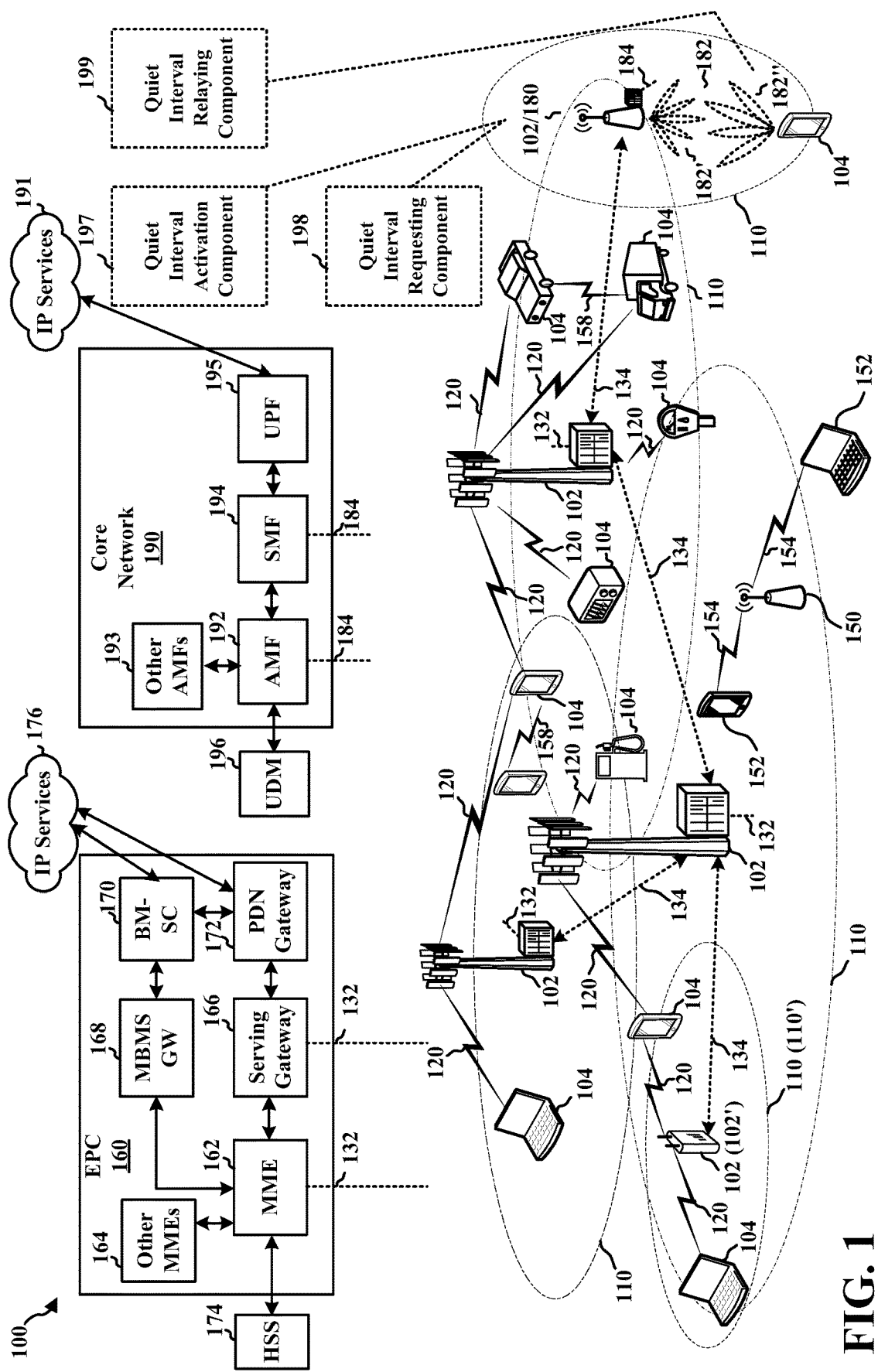
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., base station 180, may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. User Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. User Internet protocol (IP) packets are transferred through the UPF 195. The UPF 195 provides UE IP address allocation as well as other functions. The UPF 195 is connected to the IP Services 191. The IP Services 191 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the base station 102/180 may include a quiet interval activation component 197 configured to activate a quiet interval at a periodic interval; and to transmit on a transmission medium based on the quiet interval. The base station 102/180 may also or alternatively include a quiet interval requesting component 198 configured to determine if a maximum transmission power of the base station is smaller than a predetermined value; and to transmit a request for a second base station to activate a quiet interval, where the request indicates the maximum transmission power of the base station. The UE 104 may include a quiet interval relaying component 199 configured to receive from base station 102/180 a request for a second base station to activate a quiet interval; and to relay the request to the second base station.

Although the following description may be focused on 5G NR, the concepts described herein may be applicable to other similar areas, such as LTE, LTE-A, CDMA, GSM, and other wireless technologies.

Figure 2:
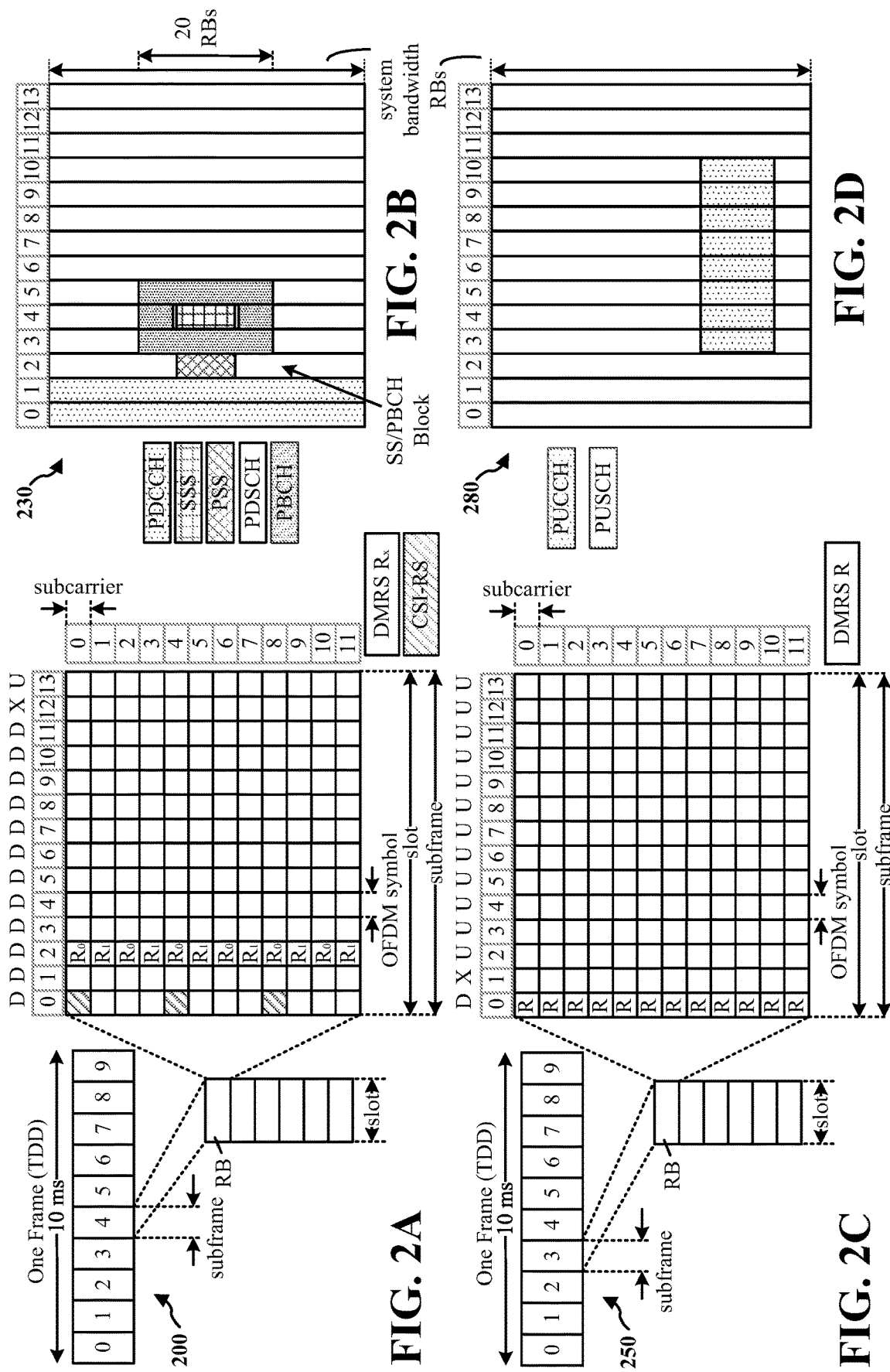
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ. 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
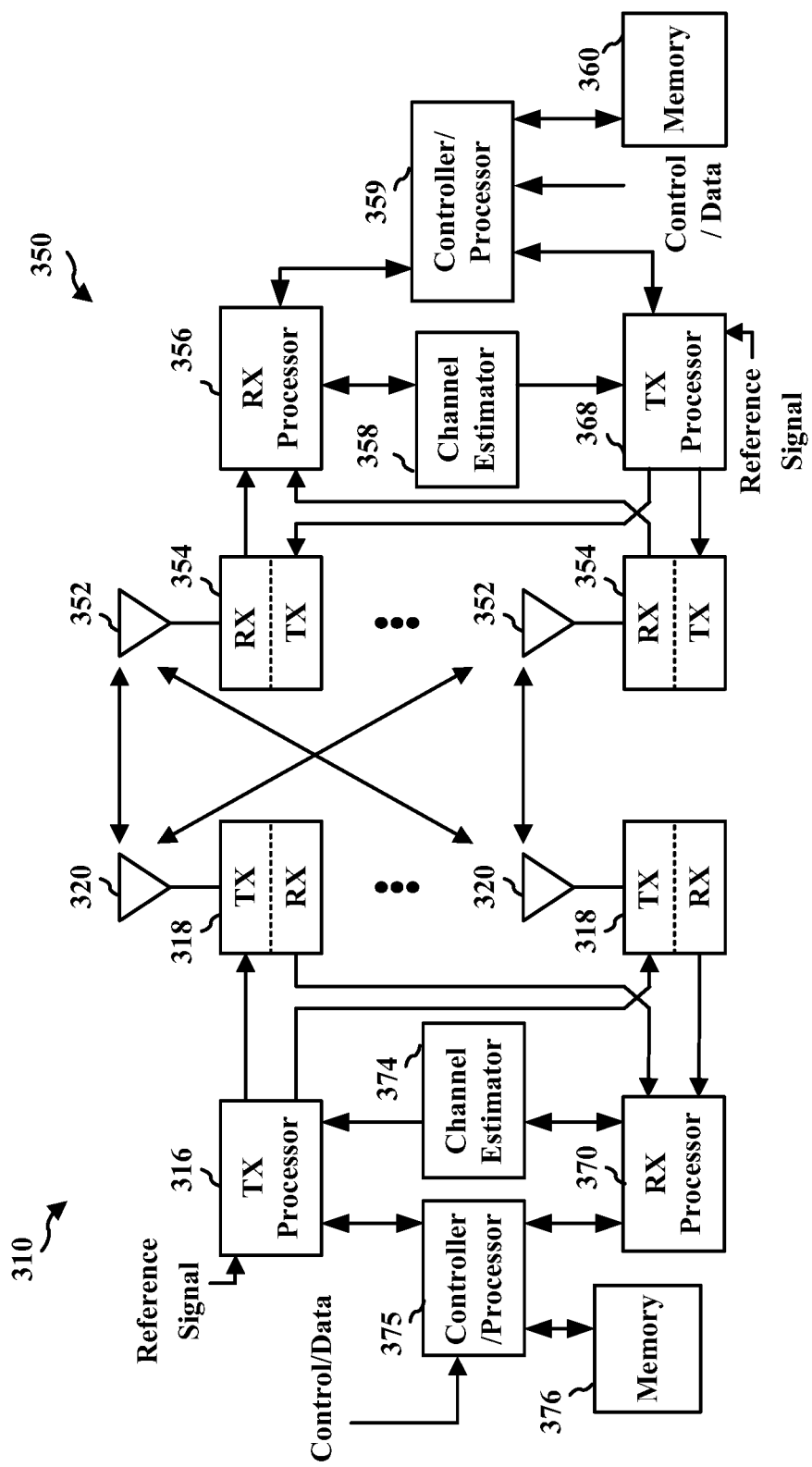
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with the quiet interval activation component 197 and the quiet interval requesting component 198 of FIG. 1.

At least one of the TX processor 368, the RX processor 356, and the controller/processor 359 may be configured to perform aspects in connection with the quiet interval relaying component 199 of FIG. 1.

In the unlicensed spectrum for NR and LTE, technologies such as LAA, eLAA and FeLAA rely on BEB for contention window management when multiple devices (cellular or Wi-Fi) simultaneously attempt to access a shared transmission medium. For example, in CSMA/CA, devices (e.g. base stations or nodes) attempting to access the shared transmission medium first perform a clear channel assessment (CCA) to determine whether the medium is free and then wait for a random amount of time before sending data (i.e. a random backoff corresponding to the duration of a contention window having a minimum slot duration CWmin and a maximum slot duration CWmax). If a device attempting to access the medium transmits data at the same time as another node and a collision occurs (e.g. detected through data Block Error Rates (BLER) in the beginning of the previous TxOP), the losing node/device's backoff time doubles under BEB to reduce the probability of future collision.

Figure 4:
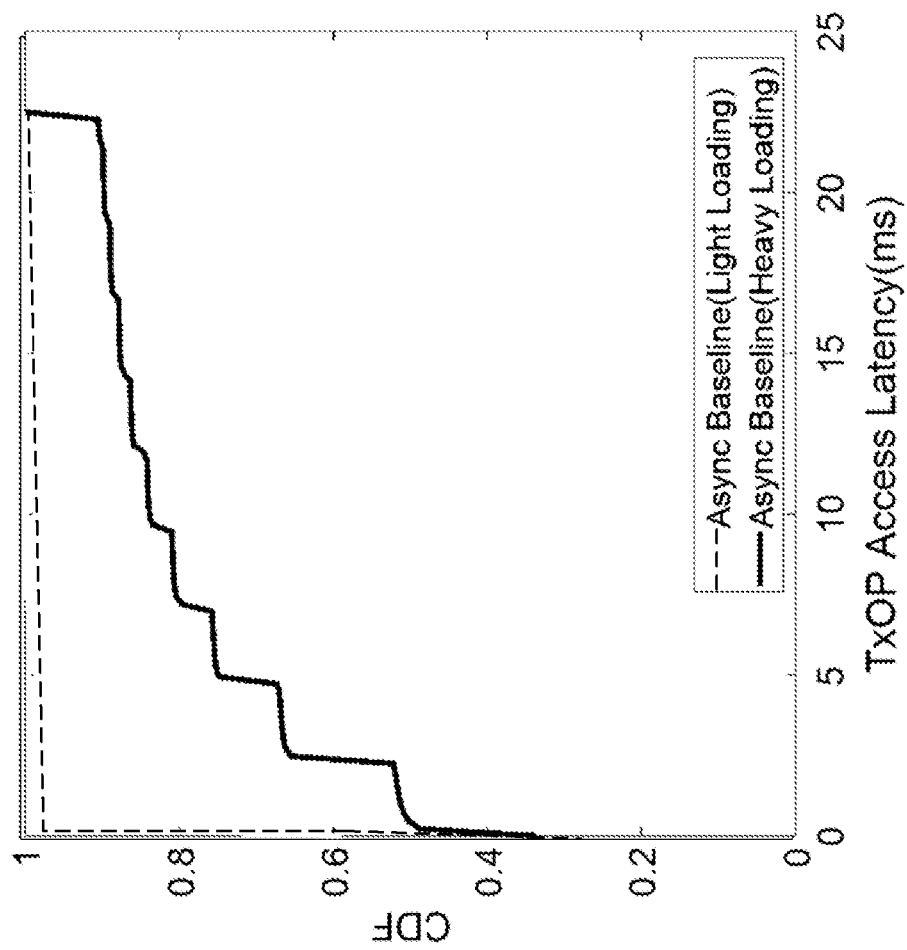
FIG. 4 is a chart comparing the cumulative density functions for Transmission Opportunity (TxOp) Access Latency of base stations in lightly loaded and heavily loaded asynchronous deployments.

While BEB has generally been adopted in 3GPP unlicensed solutions to ease coexistence with Wi-Fi systems based on BEB's use in the Wi-Fi community, BEB can lead to starvation in heavily loaded asynchronous deployments. In such deployments, the doubling of backoff time and enlargement of the contention window in BEB may result in the losing node having a higher likelihood of further collision with other devices over the medium. Further collision results in additional doubling of the backoff time until CWmax is reached, the result of which can cause the losing node to have even less chance of acquiring the medium against nodes with smaller contention windows and reduced Quality of Service (QoS). This effect can be seen in the chart 400 of FIG. 4, which represents a study conducted by the inventors of the present application comparing the cumulative density functions for TxOp Access Latency of AP/gNBs in lightly loaded and heavily loaded asynchronous deployments. As can be seen, the inventors have found the TxOp Access Latency to be greater than 20 ms for approximately 10% of devices in conventional, heavily loaded deployments. It would therefore be helpful to ameliorate the starvation effect of BEB in unlicensed bands.

While this starvation effect of BEB is not critical in Wi-Fi systems, it can significantly degrade service in NR-U systems. Wi-Fi involves best-effort QoS and is usually implemented in non-planned, low-cost/low Tx power deployments (e.g. 17 dBm plus transmit antenna gain). However NR-U/LTE may involve a better QoS to contend with Wi-Fi in the unlicensed band, which network operators conventionally implement through more advanced network structures (e.g. ultra dense deployments), larger Tx power for coverage within regulated limits (e.g. 23 dBm or 30 dBm), and mobile/flexibly deployed base stations as temporal hotspots.

However, ED based CSMA/CA (which incorporates BEB) may be the mechanism in NR-U for OTA coordination among different network/node operators. Wi-Fi includes other CSMA/CA features besides BEB such as Request To Send/Clear to Send (RTS/CTS) and other carrier-sense based signaling for inter-BSS negotiations and communications. But the timing requirements for RTS/CTS (e.g. 16 μs short interframe space (SIFS)) may be challenging to implement in NR-U, rendering it unlikely that RTS/CTS will be implemented in NR-U as a standard mechanism for TxOp coordination. Additionally, security concerns could be raised when specifying backoff timing for UE signals. Therefore, as BEB is likely to remain a primary collision avoidance mechanism in NR-U, a complementary solution to the starvation effect of BEB is desired.

Figure 5:
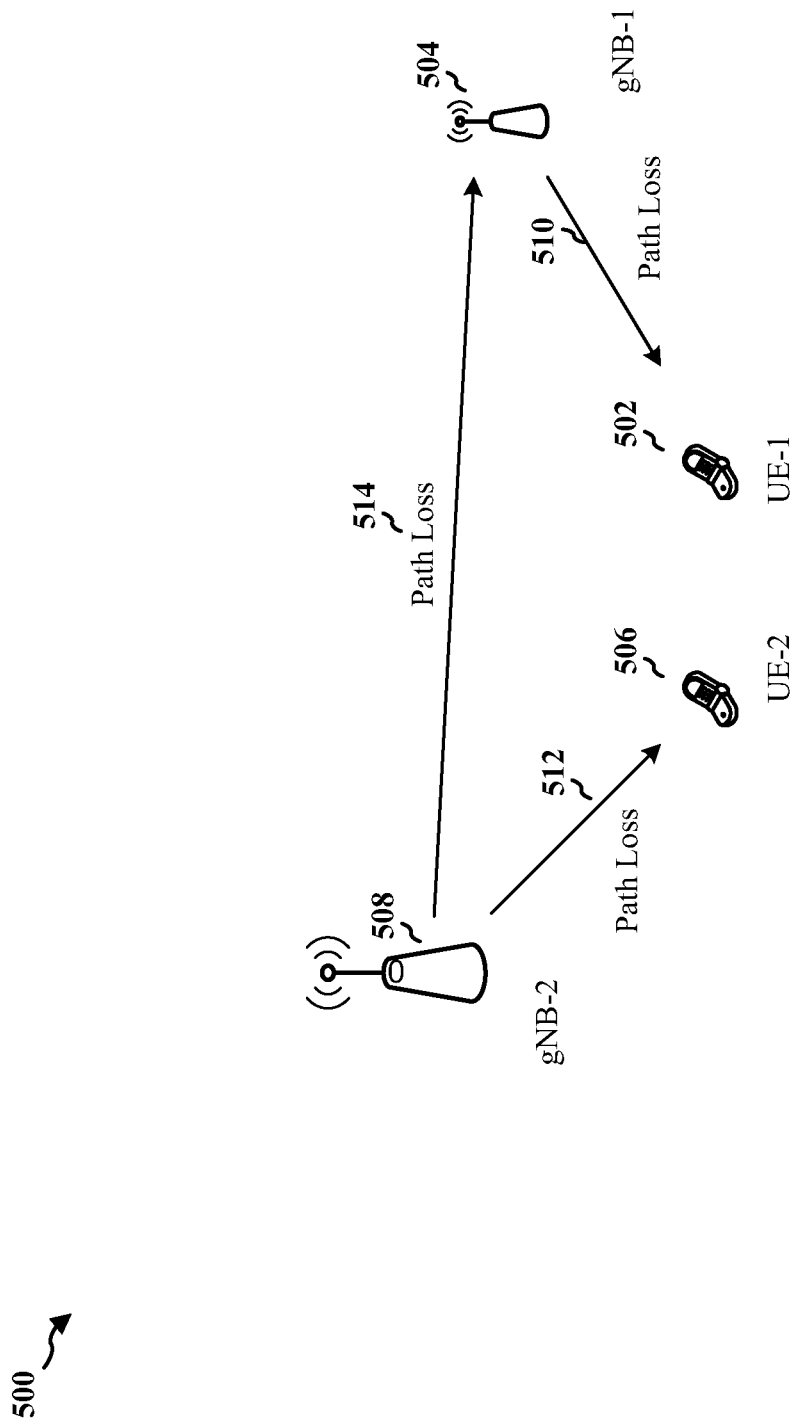
FIG. 5 is a diagram illustrating an example of base stations with larger and smaller transmission powers serving respective UEs.

FIG. 5 illustrates a system 500 in NR-U where the starvation effect can arise. A UE-1 502 may be served by a base station (e.g., gNB-1) 504 from a first NR-U operator that uses a smaller transmission power. The gNB-1 504 may use, for example, 23 dBm Tx power and have an ED threshold of −72 dBm for CSMA/CA. UE-2 506 may be served by a base station gNB-2 508 from a second NR-U operator. The base station gNB-2 508 may use a larger transmission power than base station 504. As one example, base station 508 may comprise a drive-in mobile access point for events. Base station gNB-2 508 may use, for example, 36 dBm Tx power and have an ED threshold of −85 dBm for CSMA/CA. Both base stations 504, 508 may have a signal path loss 510, 512 to their respective UEs of approximately 60 dBm (or another number). Base station 504 may also experience path loss 514 greater than 108 dBm (or another number) due to the signal from base station 508.

In such a situation where both base stations use NR-U (or where one operator uses NR-U and the other uses a different RAT such as Wi-Fi), starvation for a UE in NR-U can arise when multiple base stations are requesting resources to transmit downlink intensive communications to their UEs along the shared, unlicensed transmission medium. Referring to FIG. 5, since base station 508 has a larger Tx power compared to base station 504, the UE-2 506 being served by base station 508 would have relatively good QoS and may acknowledge (ACK) receipt of CCA transmissions from base station 508, giving base station 508 control of the medium. However, base station 504 may suffer from interference from the large Tx power of base station 508, causing UE-1 502 to have reduced QoS and fail to ACK receipt of CCA transmissions from base station 504. Under BEB, a contention window duration for base station 504 would double; yet, the process may repeat in failure due to the large transmission power and interference of base station 508, and further enlargement of the contention window for UE-1 502 would result compared to UE-2 506. Backhaul coordination between the nodes may not be available since both base stations may be served by different network operators. As a result, base station 508 would effectively prevent base station 504 from serving UE-1 502. While alternatives to BEB such as RTS/CTS may mitigate this starvation effect in Wi-Fi (e.g. large base station 508 may receive a CTS timeout from UE-2 506), such mechanisms may not be available in NR-U, as discussed supra.

Hence, it would be desirable to address this starvation effect in CSMA/CA-based channel access while maintaining BEB. In one aspect, the present application addresses the starvation effect by implementing a periodic quiet interval during which base stations with larger Tx powers reduce their transmission power or do not transmit (e.g. keep quiet) during periods of attempting to gain access to a transmission medium in NR-U. The quiet interval may be implemented in response to an OTA signal from a base station having a smaller Tx power, and may be deactivated by the larger power base station when no further OTA signals are received. The present disclosure thus ameliorates the starvation effect by allowing other base stations, with a smaller transmission power, greater opportunity to control the medium with greater QoS while maintaining BEB, e.g., in NR-U.

Figure 6:
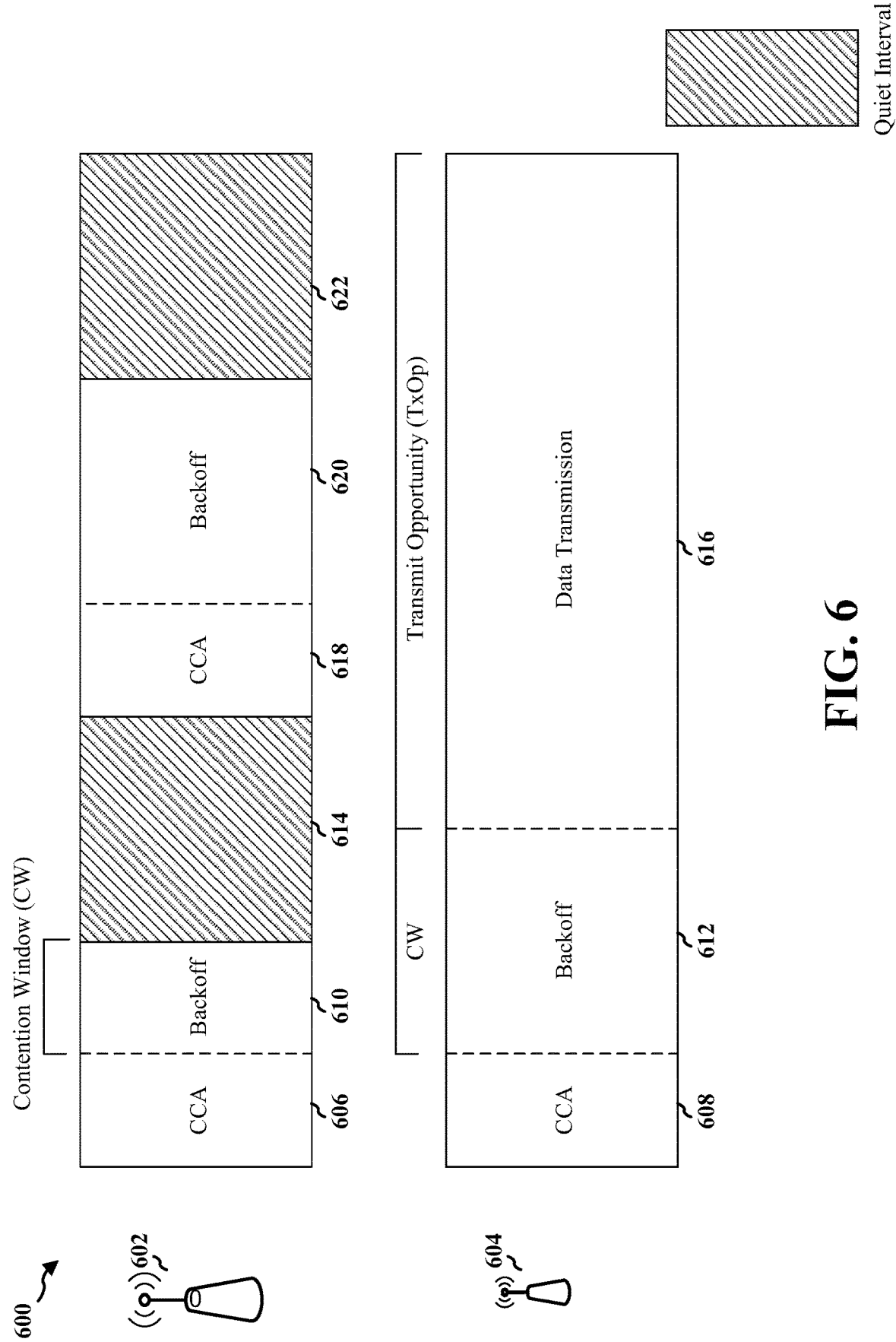
FIG. 6 is a diagram illustrating an example of two base stations competing for access to a channel in NR-U with the larger base station's transmissions incorporating a quiet interval.

FIG. 6 illustrates a block diagram 600 showing an example of two base stations competing for access to a channel in NR-U while incorporating the quiet interval of the present disclosure. Base station 602 may use a larger transmission power (e.g. similar to base station 508 having 36 dBm Tx power in FIG. 5). Base station 604 may use smaller transmission power than base station 602 (e.g. similar to base station 504 having 23 dBm Tx power in FIG. 5).

In accordance with CSMA/CA, both base stations 602, 604 first perform a CCA 606, 608 to determine whether the channel is free. Assuming the channel is clear at the time, the base stations respectively initiate a random backoff 610, 612 for the duration of their individual contention windows based on BEB. In this example, backoff 612 is illustrated as being twice the size of backoff 610 to identify base station 602 as a winner node having previously succeeded to access the medium, and base station 604 as a loser node having previously failed to access the medium.

In conventional deployments, base station 602 would normally win the medium over base station 604 due to its shorter contention window. However, in accordance with the present disclosure, after the contention window has completed base station 602 may undergo a quiet interval 614. This quiet interval may be activated in response to, for example, an indication by a network component (e.g. the EPC 160 or the core network 190) or in response to an Over The Air (OTA) request from another base station (e.g. base station 604), as discussed infra. In one aspect, base station 602 may reduce its transmission power during this quiet interval 614, for example, to below ED threshold levels (e.g. below −72 or −85 dBm) to reduce interference with base station 604 and/or prevent CSMA/CA detection by base station 604. In another aspect, base station 602 may treat the quiet interval 614 as an off duty cycle, and might not send any transmissions during the quiet interval. As a result of this quiet interval 614, base station 604 is able to transmit first (i.e. above the ED threshold), with better QoS, and thus successfully wins access to the transmission medium over base station 602. Base station 604 may then perform data transmissions 616 within its TxOp.

Once the quiet interval has completed, base station 602 will detect a collision on the channel due to base station 604's transmissions, and subsequently repeat the contention process. Thus, base station 602 may perform CCA 618, initiate a random backoff 620 doubled from BEB, and wait another quiet interval 622 before attempting to transmit. The quiet interval may repeat periodically for a predefined duration until deactivated by base station 602, for example, 5 ms out of every 100 ms.

Figure 7:
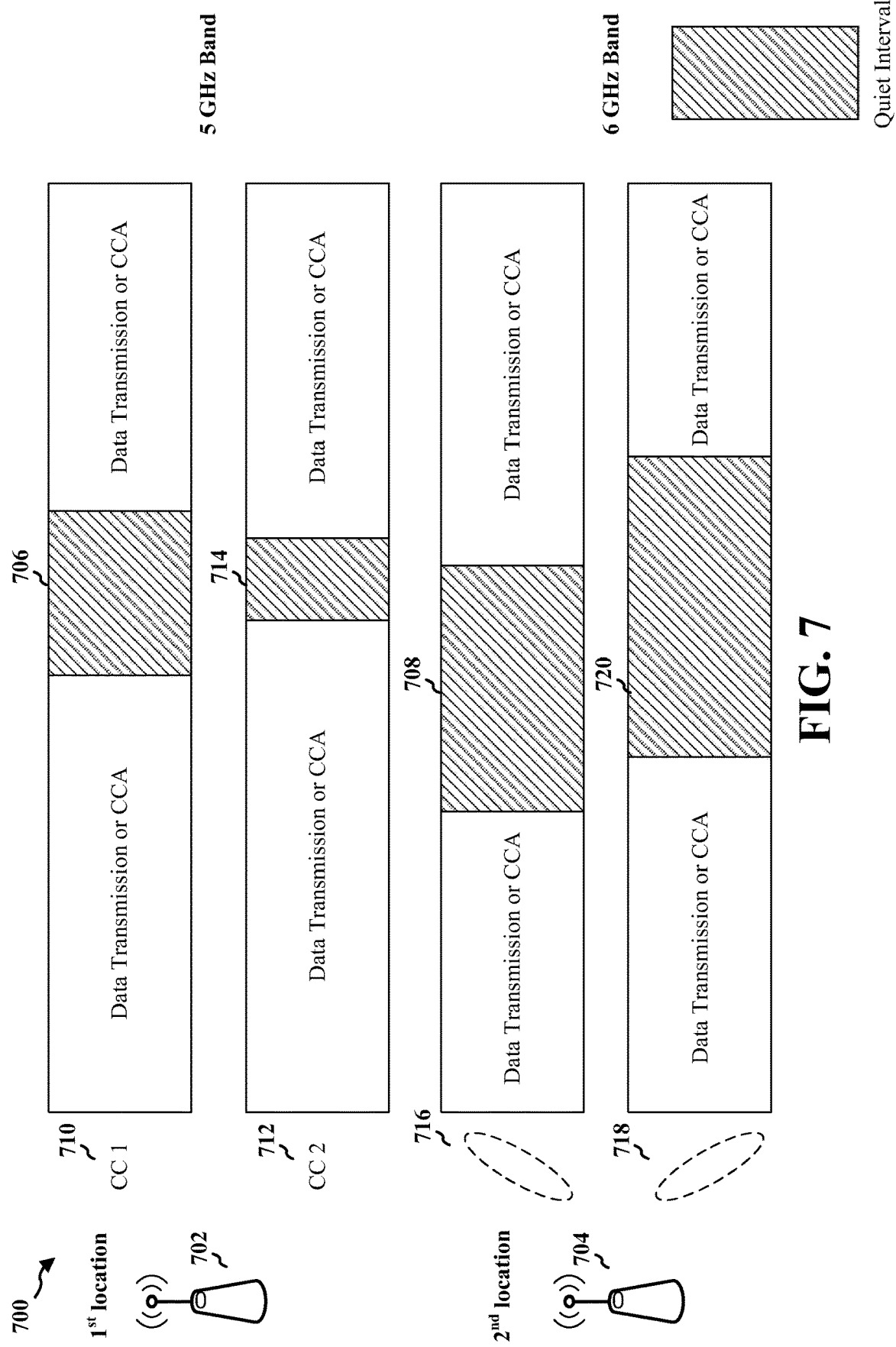
FIG. 7 is a diagram illustrating multiple examples of base station quiet intervals.

The quiet interval 614 for base station 602 may change depending on various aspects such as the base station's total transmission power, band, location, component carriers, and/or beams. FIG. 7 illustrates a block diagram 700 showing multiple examples of quiet intervals depending on these various aspects, where the quiet intervals occur after a data transmission or CCA in CSMA/CA.

In one aspect, the duration of the quiet interval may be longer for base stations with larger transmission powers. For example, base station 702 and 704 may both have large but distinct transmission powers; for example, base station 702 may have 30 dBm Tx power (or some other number), and base station 704 may have 36 dBm Tx power (or some other number greater than that of base station 702). Thus, base station 704 may observe a longer quiet interval 708 than that of base station 702, as illustrated in FIG. 7.

In another aspect, the duration of the quiet interval can be band dependent. For example, base station 702 may be a gNB operating in the 5 GHz unlicensed frequency band, while base station 704 may be a gNB operating in the 6 GHz unlicensed frequency band. Thus, base stations 702 and 704 may have different quiet intervals 706, 708 based on their operation in different bands, as illustrated in FIG. 7.

In a further aspect, the duration of the quiet interval can be location dependent. For example, base station 702 may be operating in a first location, while base station 704 may be operating in a second location. Thus, based on geolocation, base stations 702 and 704 may be configured to have different quiet intervals 706, 708 based on their operation in different physical locations, as illustrated in FIG. 7. Such configuration may occur for base stations in the 6 GHz unlicensed spectrum (e.g. base station 704).

In another aspect, the duration of the quiet interval can be independently configured for different component carriers in carrier aggregation. Moreover, the quiet interval may not be defined on a carrier if the base station is using a low transmission power, e.g., a transmission power below a threshold, over that carrier. For example, base station 702 may operate using two component carriers 710, 712. If base station 702 is transmitting with large Tx power over both component carriers (e.g. 30 dBm or 36 dBm), component carrier 712 may include a different quiet interval 714 than that of component carrier 710. However, if base station 702 is transmitting with low Tx power over one or more of the component carriers (e.g. 23 dBm over component carrier 712), that component carrier may not include a quiet interval.

In a further aspect, the duration of the quiet interval can be independently configured for different beams in analog beamforming. Moreover, the quiet interval may not be defined on a particular beam, e.g., if the base station is using a transmission power below a threshold over that beam. For example, base station 704 may transmit over two beams 716, 718 having different directions. If base station 704 is transmitting with large Tx power over both beams (e.g. 30 dBm or 36 dBm), beam 718 may include a different quiet interval 720 than that of beam 716. Additionally, the network component may dynamically configure the duration of quiet interval 720 to be longer than quiet interval 708 if the server determines that beam 718 is causing interference with other nodes due to its large Tx power. However, if base station 704 is transmitting with low Tx power over one or more of the beams (e.g. 23 dBm over beam 718), that beam may not include a quiet interval.

Figure 8:
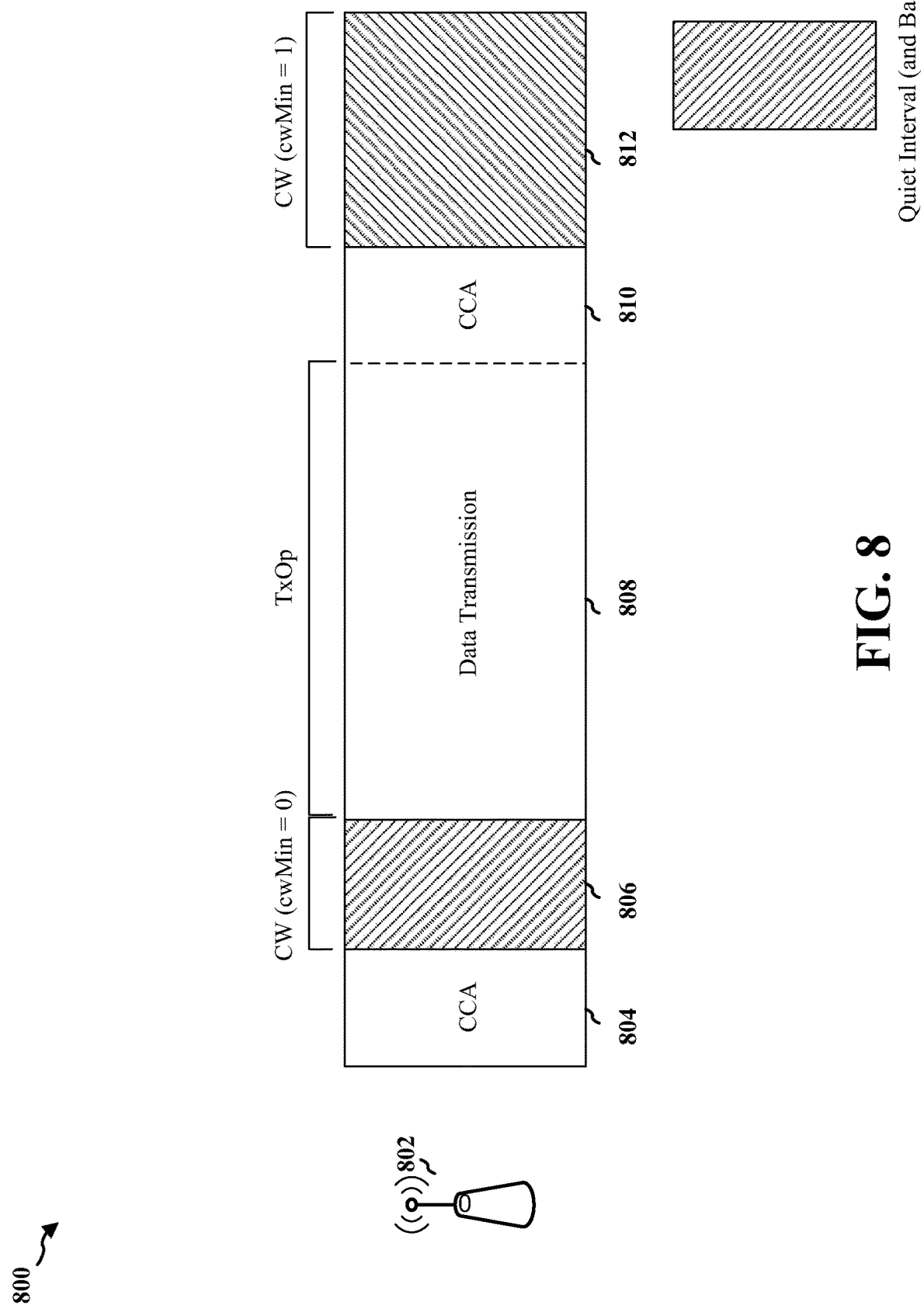
FIG. 8 is a diagram illustrating an example of a base station competing for access to a channel in NR-U and implementing a quiet interval through periodically increased CWmin.

As discussed above, the base stations may implement the quiet intervals by reducing (or turning off) their transmission power during the quiet interval. However, in another aspect, the base stations may implement the quiet intervals as periodically increased CWmin in the current BEB CSMA/CA framework. FIG. 8 illustrates a block diagram 800 of an example of a base station competing for access to a channel in NR-U where the quiet interval is implemented through periodically increased CWmin. In contrast to FIG. 6, in this example the quiet interval incorporates the random backoff and its associated parameters including CWmin. Thus, base station 802 (e.g. large gNB 508 in FIG. 5) may perform a CCA 804 to check if the channel is clear, and then initiate a random backoff for the duration of quiet interval 806 having a minimum slot timing value CWmin (e.g. CWmin=0). The base station 802 may then gain access to the medium and send data transmissions 808 during its TxOp, after which it again performs CCA 810 and initiates another random backoff for the duration of quiet interval 812. However, for quiet interval 812 the minimum slot timing value CWmin may be increased by a specified value (here CWmin=1), thus forcing base station 802 to wait at least one extra slot before transmitting. Similarly, CWmin may periodically increase each quiet interval for a predetermined period of time, or until deactivation of the quiet interval. Thus, the probability that base station 802 can win the medium decreases over time, allowing base stations with smaller Tx power more opportunity to control the medium.

Figure 9:
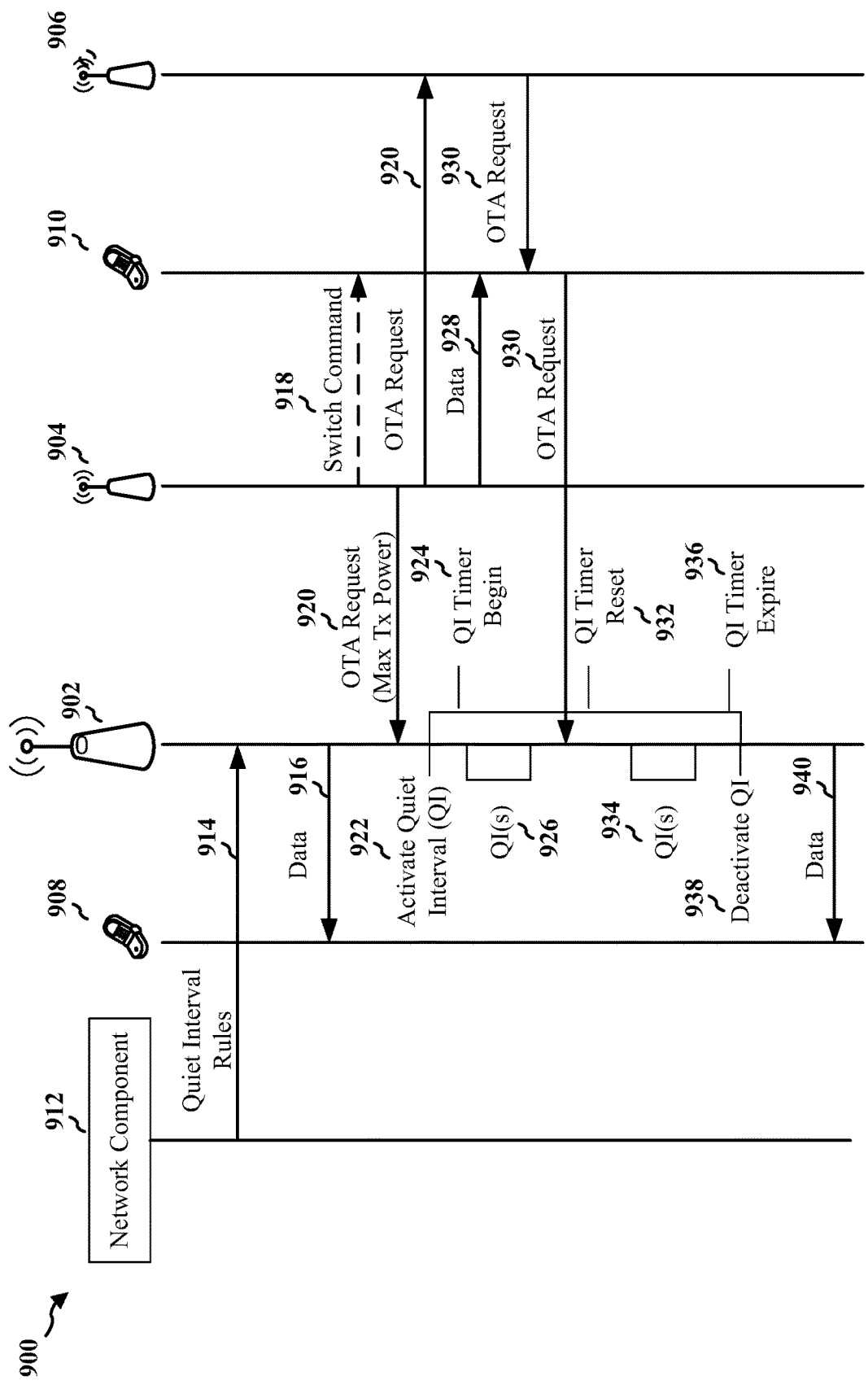
FIG. 9 is a call flow diagram between multiple base stations, UEs, and a network component.

FIG. 9 illustrates a call flow diagram 900 between multiple base stations and UEs in accordance with the present disclosure. For example, base station 902 may use a larger Tx power (e.g. similar to base station 508, 602, 802) contending for access to a channel in NR-U, while base stations 904, 906 use a smaller Tx power (e.g. similar to base station 504, 604) contending with base station 902 for access to the same channel. UE 908 (e.g. UE-2 506) may be served by base station 902, while UE 910 (e.g. UE-1 502) may be served by base stations 904 and/or 906. Base stations 902, 904, and 906 may also be in communication with a network component 912 (e.g. the EPC 160 or core network 190). The network component may include a geolocation component.

In one aspect, the base station may activate a quiet interval based on pre-defined rules, network commands, geolocation, and/or OTA Requests. Such rules may be country-wide and long term (e.g. standardized), band or location dependent (e.g. localized), power dependent, etc. For example, the base station 902 may receive rules 914 for activating and configuring the quiet interval from network component 912. The rules may indicate that base station 902 activates the quiet interval when it attempts to access a particular channel and has a large transmission power greater than or equal to a specified threshold (e.g. 30 dBm or 36 dBm). The rules may indicate, for example, whether the base station reduces transmission power, not transmit, or periodically increases CWmin during the quiet interval. The duration of the quiet interval may be configured depending on the Tx power, band, location, carrier(s), or beam(s) as discussed above. The rules may also indicate that base station 902 activates and deactivates the quiet interval, for example, based on an OTA Request from other base stations or UEs as discussed infra.

Base stations 902, 904 then contend for access to the medium. In this example, base station 902 wins access to the medium over base station 904 and accordingly transmits data 916 to UE 908. However, base station 904 may have lost access to the medium multiple times due to interference caused by the large Tx power of base station 902, and therefore may suffer from starvation effects as discussed above. Moreover, due to tracking area limitations or network planning rules, base station 904 may not be able to compensate for this interference by increasing its own Tx power past its maximum (e.g. 23 dBm).

Therefore, to increase QoS, base station 904 may transmit an OTA Request 920 requesting nearby base stations to reduce interference by activating their own quiet intervals. The OTA Request includes the maximum transmission power of the sending base station. For example as illustrated in FIG. 9, base station 904 may broadcast an OTA Request including its maximum Tx power to nearby base stations 902 and 906. The request may alternatively be multicast or unicast to specific base stations.

In some aspects, base station 904 may be configured to transmit the OTA Request if base station 904 has lost access to the transmission medium repeatedly enough such that the doubling of backoff timing under BEB has increased to CWmax. Before sending the request, base station 904 may also optionally send a command 918 to the UEs it serves, including UE 910, to temporarily switch to another frequency with less interference.

In one aspect, the base station 904 may be configured to transmit the request if its maximum Tx power is smaller than a predetermined value (e.g. 30 dBm, 36 dBm, etc.). This predetermined value may be, for example, predefined by the network operator or indicated by the network component 912.

In another aspect, base station 904 may utilize time and frequency repetition to boost coverage of the OTA Request 920. For example, base station 904 may boost coverage by accumulating extra bits in the time and/or frequency domain when transmitting the OTA Request. In such case, base station 904 would assume that receiving base stations (e.g. base stations 902 and 906) can decode the accumulated signal.

In a further aspect, base station 904 may allow receiving base stations (e.g. base station 902, 906) to activate the quiet interval for a plurality of TxOps after receiving the OTA Request 920. For example, base station 902 may periodically reduce transmission power or undergo an off duty cycle for tens or even hundreds of TxOp after receiving the OTA Request 920 in order to enable a starved base station ample time to access the medium. The OTA Request 920 may also allow for flexible response timing; for example, base station 902 may not be required to respond immediately to the request (in contrast to RTS/CTS, for example) but can activate the quiet interval a predetermined delay after receiving the OTA Request (e.g. 100 ms or another number). This predetermined delay may be independent of, or different than, the quiet interval timer 924, which as discussed infra, will be triggered and down-counted when the quiet interval is activated, and which will result upon expiration in deactivation of the quiet interval if a subsequent OTA Request is not received. This timer may also be independent of the number of TxOp during which the quiet interval is activated.

In another aspect, the OTA Request 920 may leverage sequences with good auto-correlation or cross-correlation properties to facilitate detection of the request by receiving base stations in the time domain. For example, base station 904 may configure the OTA Request 920 to include a pseudo-noise (PN) sequence or a Zadoff-Chu (ZC) sequence to enable base station 902 to easily detect the OTA Request.

In a further aspect, the OTA Request 920 may be protected by a security mechanism agreed upon between cooperative network operators. The security mechanism may include a certificate, for example. In one example, base stations 902 and 904 may be controlled by different network operators, and so base station 902 may not know the source of a broadcast OTA Request 920. The certificate or other security mechanism would therefore allow base station 902 to ascertain whether the OTA Request is valid as opposed to being transmitted by an unauthorized source, for example, to avoid unfairly depriving its UEs (e.g. UE 908) of service.

In an additional aspect, the OTA Request may be relayed by a UE in response to a request by its serving base station. For example, FIG. 9 illustrates a subsequent OTA Request 930 (discussed infra) transmitted by base station 906. In this example, base station 906 may be suffering from interference from base station 902, but may not be able to directly send an OTA Request to the base station due to geographical separation or other factors. Accordingly, base station 906 may identify one or more UEs which the base station 906 serves and that are closest to base station 902 (e.g. UE 910). The base station 906 may then transmit the OTA Request to a nearby UE to be relayed to a more distant base station. Thus, base station 906 may broadcast, multicast, or unicast its OTA Request 930 to UE 910 to be relayed to base station 902.

Once a base station receives the OTA Request 920 including the sending base station's maximum Tx power and ascertains that the request is valid, the receiving base station determines whether its current Tx power is larger than the maximum Tx power identified in the OTA Request. If so, the receiving base station may then activate the quiet interval. For example, base station 902 may determine that its current Tx power is larger than the maximum Tx power of base station 904, while base station 906 may determine that its current Tx power is not larger than the maximum Tx power of base station 904. Therefore, in this example, base station 902 may activate its quiet interval (922) in accordance with the rules 914, since base station 906 may not be causing a starvation issue.

Subsequently, the base station transmits its data based on the activated quiet interval. Upon activation, a quiet interval timer 924 begins and the base station 902 experiences periodic quiet intervals for the duration of the timer (e.g. reduced Tx power, off duty cycles, increased CWmin). Thus, FIG. 9 illustrates that base station 902 undergoes one or more quiet intervals 926 for the duration of the timer. As a result of these quiet intervals, base station 904 may win the transmission medium over base station 902 and subsequently transmit its own data 928.

While base station 902 continues to experience one or more quiet intervals 926 for the duration of quiet interval timer 924, it monitors the transmission medium for additional OTA Requests 920. If, before expiration of the timer, the base station does not receive another OTA Request identifying a maximum Tx power smaller than its current Tx power, the base station may deactivate the quiet interval. However, if the base station receives another valid OTA Request before the timer has elapsed, the timer may reset and the base station may continue to experience periodic quiet intervals for the duration of the reset timer. The additional quiet intervals may be identical to those previous, or different (e.g. having a longer duration, etc.).

For instance, in the example of FIG. 9, prior to expiration of the timer 924, base station 902 receives a subsequent OTA Request 930 identifying the maximum Tx power of sending base station 906. The OTA Request 930 may be received from a relaying UE, e.g., UE 910, as discussed supra. Base station 902 may determine that its current Tx power (which may include either its original Tx power or its reduced Tx power based on the quiet interval) is larger than the maximum Tx power of the sending base station. Accordingly, base station 902 will maintain activation, timer 924 is reset (932), and base station 902 will continue experiencing further quiet intervals 934 for the duration of the reset timer.

If no further OTA Requests are received and the timer 924 (and/or 932) elapses, the base station deactivates the quiet interval. Thus, in the example of FIG. 9, as no further OTA Requests 920, 930 are received before the timer expires (936), base station 902 deactivates its quiet interval (938). Accordingly, base station 902 may contend for access to the transmission medium and transmit data 940 as normally.

Figure 10:
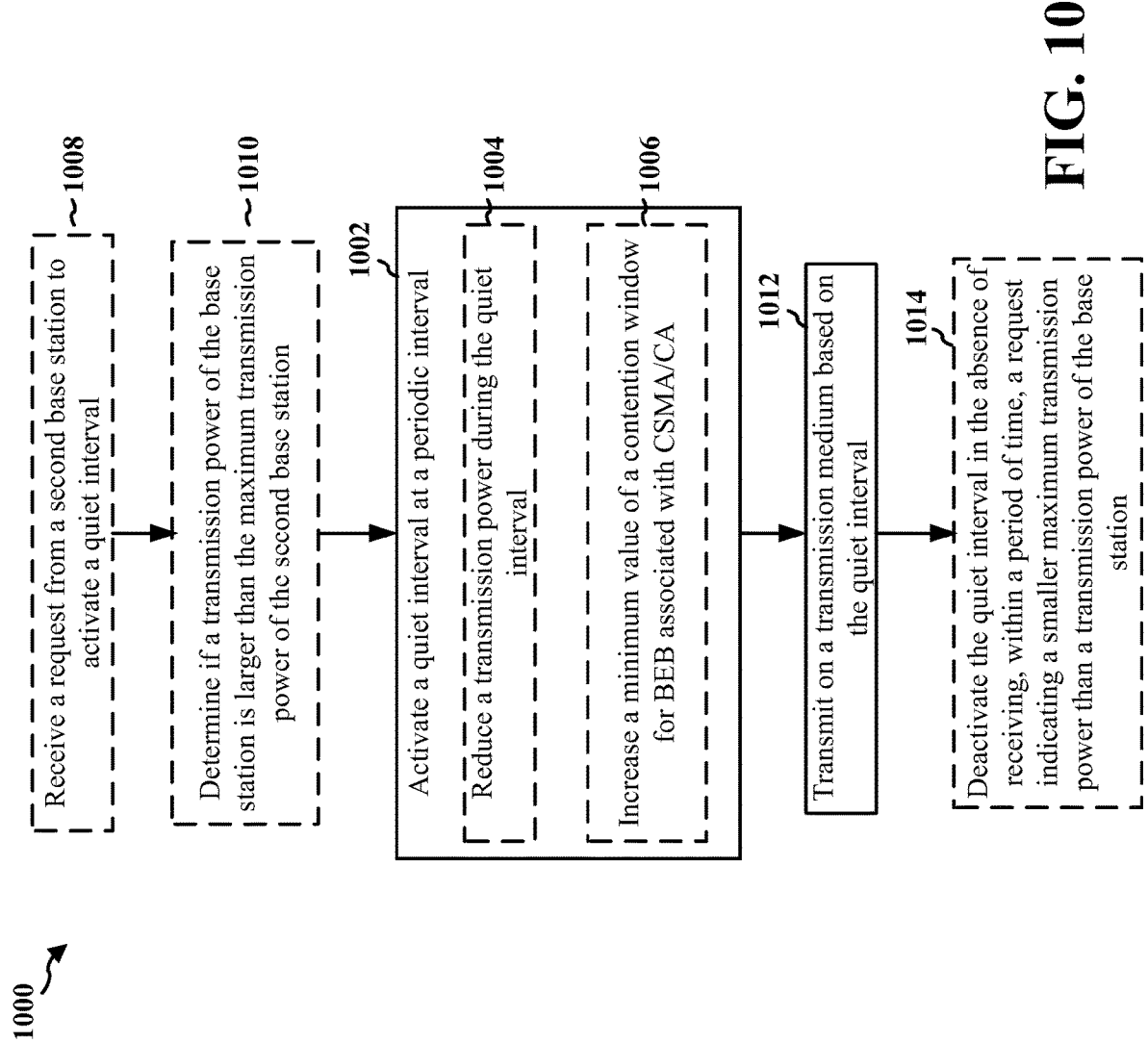
FIG. 10 is a flowchart of a method of wireless communication performed by a base station (with large Tx power).

FIG. 10 is a flowchart 1000 of a method of wireless communication. The method may be performed by a first base station operating in an unlicensed spectrum (e.g., the base station 102/180, 310, 508, 602, 702, 704, 802, 902, the apparatus 1102/1102'; the processing system 1214, which may include the memory 376 and which may be the entire base station 310 or a component of the base station 310, such as the TX processor 316, the RX processor 370, and/or the controller/processor 375) which receives communications from a second base station operating in an unlicensed spectrum (e.g. the base station 504, 604, 904, 906) and a UE (e.g. UE-2 506 and UE 908). Optional aspects are illustrated with a dashed line. The method improves the ability of a second base station to gain control over an unlicensed, shared transmission medium in NR-U by allowing the first base station (i.e. an interfering base station with large transmission power) to implement a quiet interval.

At 1008, the first base station may receive a request from a second base station to activate the quiet interval. For example, 1008 may be performed by activation request receive component 1114 from FIG. 11. The request includes a maximum transmission power of the second base station. The request may also be broadcast, multicast, or unicast. For example, referring to FIG. 9, base station 902 may receive an OTA Request 920 broadcast by base station 904 or an OTA Request 930 relayed from base station 906 which requests that base station 902 reduce interference by activating its own quiet intervals. The OTA Request may include the maximum transmission power of the sending base station (904 or 906).

At 1010, the first base station may determine if a transmission power of the first base station is larger than the maximum transmission power of the second base station. For example, 1010 may be performed by determination component 1116 from FIG. 11. The first base station may activate the quiet interval if the transmission power of the first base station is larger than the maximum transmission power of the second base station. For example, referring to FIG. 9, once base station 902 receives the OTA Request including the sending base station's maximum Tx power and ascertains that the request is valid, base station 902 may determine whether its current Tx power is larger than the maximum Tx power identified in the OTA Request. If so, base station 902 may then activate the quiet interval. For instance, base station 902 may determine that its current Tx power is larger than the maximum Tx power of base station 904, and therefore activate its quiet interval (922) in accordance with rules 914.

In one aspect, the first base station may activate the quiet interval for a plurality of transmit opportunities (TxOP) a predetermined delay after receiving the request. For example, referring to FIG. 9, base station 902 may periodically reduce transmission power or undergo an off duty cycle for tens or even hundreds of TxOp after receiving the OTA Request 920 in order to enable a starved base station ample time to access the medium. The OTA Request 920 may also allow for flexible response timing; for example, base station 902 may not be required to respond immediately to the request (in contrast to RTS/CTS, for example) but can activate the quiet interval a predetermined delay after receiving the OTA Request (e.g. 100 ms).

In another aspect, the request includes a sequence with an autocorrelation or cross-correlation property. For example, referring to FIG. 9, base station 904 may configure the OTA Request 920 to include a pseudo-noise (PN) sequence or a Zadoff-Chu (ZC) sequence to enable base station 902 to easily detect the OTA Request.

In a further aspect, the request may include a security mechanism. The security mechanism may comprise a certificate, for example. Referring to FIG. 9, base stations 902 and 904 may be controlled by different network operators, and so base station 902 may not know the source of a broadcast OTA Request 920. The certificate or other security mechanism would therefore allow base station 902 to ascertain whether the OTA Request is valid to avoid unfairly depriving its UEs (e.g. UE 908) of service.

At 1002, the first base station activates a quiet interval at a periodic interval. For example, 1002 may be performed by activation component 1106 from FIG. 11. In one aspect, the base station may activate a quiet interval based on predefined rules, geolocation server commands, and/or OTA Requests. Such rules may be country-wide and long term (e.g. standardized), band or location dependent (e.g. localized), or power dependent. For example, referring to FIG. 9, the base station 902 may receive pre-defined rules 914 for activating and configuring the quiet interval from network component 912. The rules may indicate that base station 902 activates the quiet interval when it attempts to access a particular channel and has a large transmission power greater than or equal to a specified threshold (e.g. 30 dBm or 36 dBm). The rules may indicate, for example, whether the base station reduces transmission power or not transmit (i.e. undergo an off duty cycle) as discussed with respect to FIG. 6, or periodically increase CWmin during the quiet interval as discussed with respect to FIG. 8. The duration of the quiet interval may be configured depending on the Tx power, band, location, carrier(s), or beam(s) as discussed with respect to FIGS. 6 and 7. The rules may also indicate that base station 902 activates and deactivates the quiet interval, for example, based on an OTA Request from other base stations or UEs.

In one aspect, a duration of the quiet interval may depend on a transmission power of the first base station. For example, referring to FIG. 7, the duration of the quiet interval may be longer for base stations with larger transmission powers. For instance, base station 702 may have 30 dBm Tx power, and base station 704 may have 36 dBm Tx power. Thus, base station 704 may have a longer quiet interval 708 than that of base station 702.

In another aspect, a duration of the quiet interval may be based on a band where the transmission medium is located. For example, referring to FIG. 7, base station 702 may operate in the 5 GHz unlicensed frequency band, while base station 704 may operate in the 6 GHz unlicensed frequency band. Thus, base stations 702 and 704 may have different quiet intervals 706, 708 based on their operation in different bands.

In a further aspect, a duration of the quiet interval may depend on the physical location of the first base station. For example, referring to FIG. 7, base station 702 may be a gNB operating in a first physical location, while base station 704 may be a gNB operating in a second physical location. Thus, one or more network components may dynamically configure base stations 702 and 704 to have different quiet intervals 706, 708 based on their operation in different physical locations. Such configuration may be used for base stations in the 6 GHz unlicensed spectrum (e.g. base station 704).

In another aspect, the transmission medium may comprise multiple carriers, where an independent quiet interval is configured for each carrier. For example, referring to FIG. 7, base station 702 may operate using two component carriers 710, 712. If base station 702 is transmitting with large Tx power over both component carriers (e.g. 30 dBm or 36 dBm), component carrier 712 may include a different quiet interval 714 than that of component carrier 710. However, if base station 702 is transmitting with low Tx power over one or more of the component carriers (e.g. 23 dBm over component carrier 712), that component carrier may not include a quiet interval.

In yet a further aspect, the transmission medium may comprise multiple beams and an independent quiet interval is configured for each beam. For example, referring to FIG. 7, base station 704 may transmit over two beams 716, 718 having different directions. If base station 704 is transmitting with large Tx power over both beams (e.g. 30 dBm or 36 dBm), beam 718 may include a different quiet interval 720 than that of beam 716. Additionally, the network component may dynamically configure the duration of quiet interval 720 to be longer than quiet interval 708 if the server determines that beam 718 is causing interference with other nodes due to its large Tx power. However, if base station 704 is transmitting with low Tx power over one or more of the beams (e.g. 23 dBm over beam 718), that beam may not include a quiet interval.

At 1004, the first base station reduces a transmission power during the quiet interval. For example, 1004 may be performed by reduction component 1108 from FIG. 11. The base station may also not transmit (e.g. refrain from transmitting) during the quiet interval. For example, referring to FIG. 6, base station 602 may reduce its transmission power during a quiet interval 614, for instance, to below ED threshold levels (e.g. below −72 or −85 dBm), to reduce interference with base station 604 and/or prevent CSMA/CA detection by base station 604. Alternatively, base station 602 may treat the quiet interval 614 as an off duty cycle, and does not send any transmissions during the quiet interval. As a result of this quiet interval 614, base station 604 can transmit first (i.e. above the ED threshold), with better QoS, and thus successfully wins access to the transmission medium over base station 602. Base station 604 may then perform data transmissions 616 within its TxOp. Once the quiet interval has completed, base station 602 will detect a collision on the channel due to base station 604's transmissions, and subsequently repeat the contention process.

At 1006, the first base station may increase a minimum value of a contention window for BEB associated with CSMA/CA. For example, 1006 may be performed by increase component 1110 from FIG. 11. As discussed above, the base stations may implement the quiet intervals as periodically increased CWmin in the current BEB CSMA/CA framework. For example, referring to FIG. 8, base station 802 (e.g. large gNB 508 in FIG. 5) may perform a CCA 804 to check if the channel is clear, and then initiate a random backoff for the duration of quiet interval 806 having a minimum slot timing value CWmin (e.g. CWmin=0). The base station 802 may then gain access to the medium and send data transmissions 808 during its TxOp, after which it again performs CCA 810 and initiates another random backoff for the duration of quiet interval 812. However, for quiet interval 812 the minimum slot timing value CWmin may be increased by a specified value (here CWmin=1), thus forcing base station 802 to wait at least one extra slot before transmitting. Similarly, CWmin may periodically increase each quiet interval for a predetermined period of time, or until deactivation of the quiet interval. Thus, the probability that base station 802 can win the medium decreases over time, allowing base stations with smaller Tx power more opportunity to control the medium.

At 1012, the first base station transmits on a transmission medium based on the quiet interval. For example, 1012 may be performed by transmission component 1112 from FIG. 11. Access to the transmission medium by the base station is gained using a contention window as discussed supra. For example, referring to FIG. 9, after activating the quiet interval, the base station transmits its data based on the activated quiet interval. Upon activation, a quiet interval timer 924 begins and the base station 902 experiences periodic quiet intervals for the duration of the timer (e.g. reduced Tx power, off duty cycles, increased CWmin). The base station 902 may undergo one or more quiet intervals 926 for the duration of the timer.

Finally, at 1014, the first base station may deactivate the quiet interval in the absence of receiving, within a period of time, a request indicating a smaller maximum transmission power than a transmission power of the first base station. For example, 1014 may be performed by deactivation component 1118 from FIG. 11. For example, referring to FIG. 9, while base station 902 continues to experience one or more quiet intervals 926 for the duration of quiet interval timer 924, the base station monitors the transmission medium for additional OTA Requests. If, before expiration of the timer, the base station does not receive another OTA Request identifying a maximum Tx power smaller than its current Tx power, the base station may deactivate the quiet interval. Thus, in the example of FIG. 9, when no further OTA Requests 920, 930 are received before the timer expires (936), base station 902 deactivates its quiet interval (938).

Figure 11:
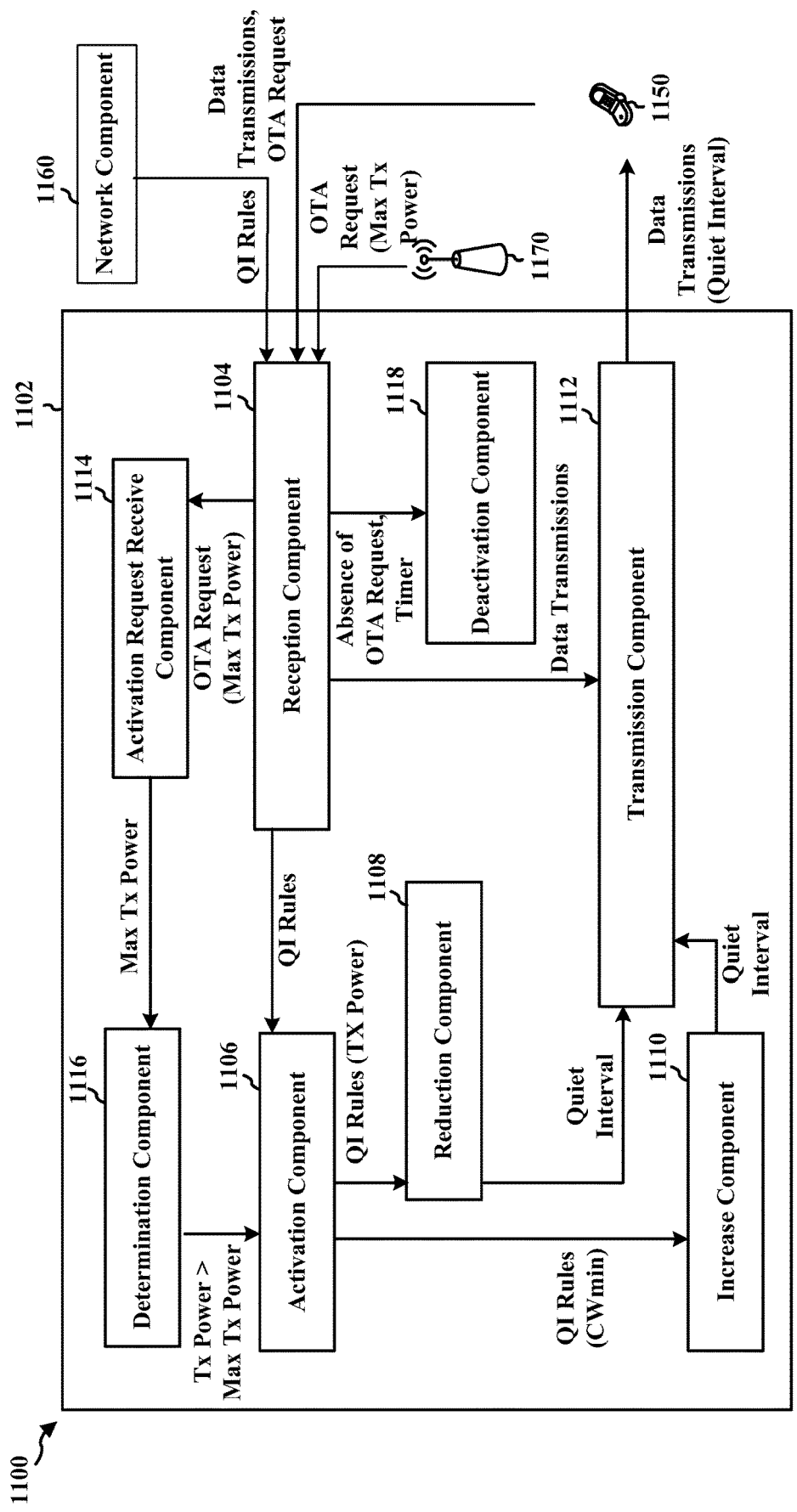
FIG. 11 is a conceptual data flow diagram illustrating the data flow between different means/components in an example base station apparatus.

FIG. 11 is a conceptual data flow diagram 1100 illustrating the data flow between different means/components in an example apparatus 1102. The apparatus may be a first base station (e.g. the base station 508, 602, 702, 704, 802, 902). The apparatus includes a reception component 1104 that receives uplink data transmissions or relayed OTA requests from a UE 1150 (e.g. UE-2 506 and UE 908), quiet interval (QI) activation rules (e.g. rules 914) from a network component 1160, and OTA requests from a second base station 1170 (e.g. the base station 504, 604, 904, 906). The apparatus also includes an activation component 1106 that activates a quiet interval at a periodic interval based on the rules, e.g., as described in connection with 1002 from FIG. 10. For implementing the quiet interval, the apparatus includes a reduction component 1108 that reduces a transmission power of the apparatus (including implementing an off duty cycle) during the quiet interval, e.g., as described in connection with 1004 from FIG. 10, and an increase component 1110 that increases a minimum value of a contention window for BEB associated with CSMA/CA of the apparatus, e.g., as described in connection with 1006 from FIG. 10. The apparatus further includes a transmission component 1112 that transmits downlink data transmissions to the UE 1150 on a transmission medium based on the quiet interval, e.g., as described in connection with 1012 from FIG. 10.

The apparatus additionally includes an activation request receive component 1114 that receives an OTA Request from the second base station to activate the quiet interval, e.g., as described in connection with 1008 from FIG. 10, where the request includes a maximum transmission power of the second base station. The apparatus also includes a determination component 1116 that determines if a transmission power of the apparatus is larger than the maximum transmission power of the second base station identified in the OTA Request, e.g., as described in connection with 1010 from FIG. 10. The activation component 1106 activates the quiet interval in response to the determination if the transmission power of the apparatus is larger than the maximum transmission power of the second base station. Moreover, the apparatus includes a deactivation component 1118 that deactivates the quiet interval in the absence of receiving from the second base station, within a period of time, an OTA Request indicating a smaller maximum transmission power than a transmission power of the apparatus, e.g., as described in connection with 1014 from FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
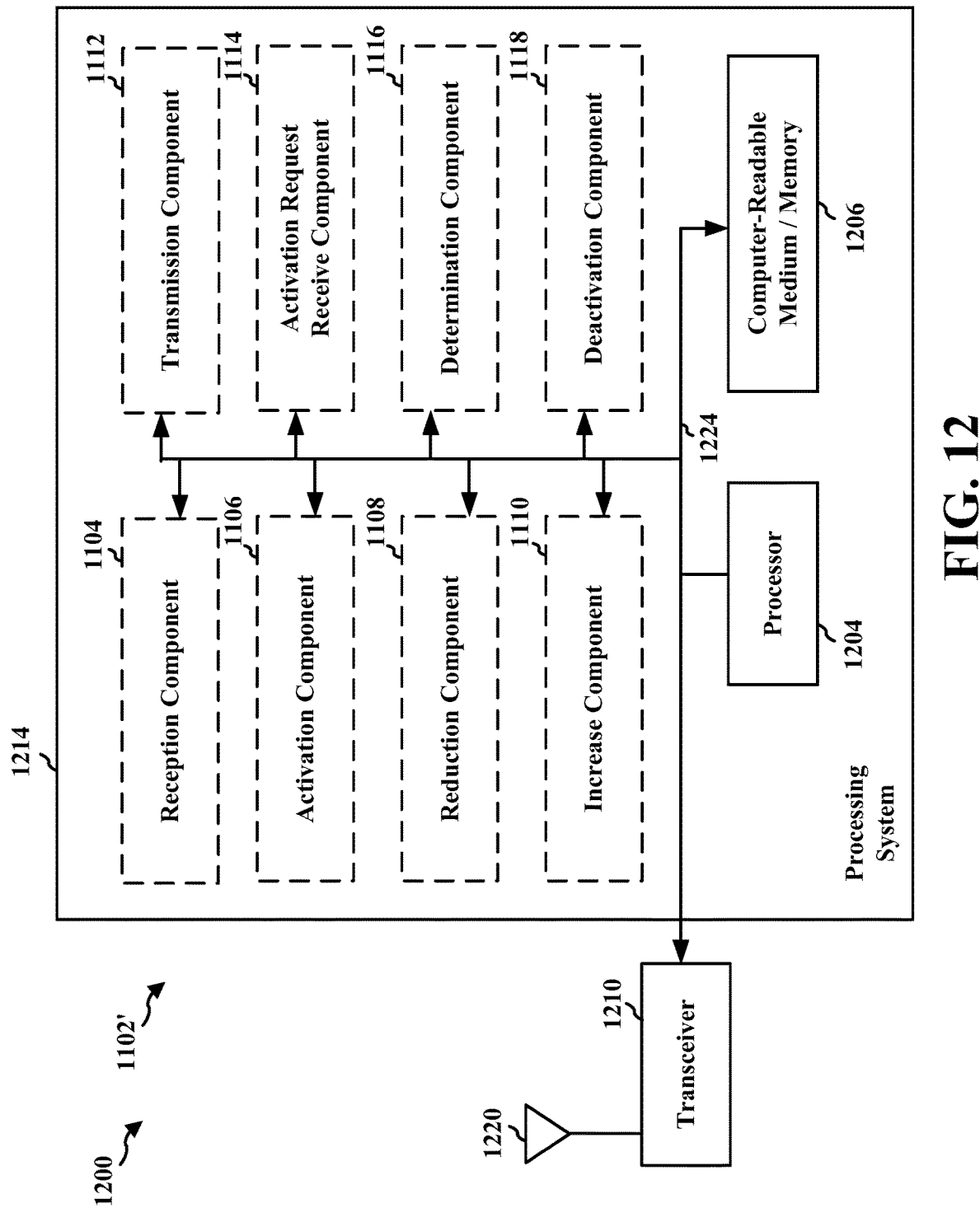
FIG. 12 is a diagram illustrating an example of a hardware implementation for a base station apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. Alternatively, the processing system 1214 may be the entire base station (e.g., see 310 of FIG. 3).

In one configuration, the apparatus 1102/1102' for wireless communication includes means for activating a quiet interval at a periodic interval and means for transmitting on a transmission medium based on the quiet interval. The means for activating may be configured to increase a minimum value of a contention window for binary exponential backoff (BEB) associated with Carrier Sense Multiple Access with Collision Avoidance (CSMA/CA). The apparatus 1102/1102' may also include means for reducing a transmission power during the quiet interval. In another configuration, the apparatus 1102/1102' includes means for receiving a request from a second base station to activate the quiet interval, where the request includes a maximum transmission power of the second base station, and means for determining if a transmission power of the base station is larger than the maximum transmission power of the second base station, where the base station activates the quiet interval if the transmission power of the base station is larger than the maximum transmission power of the second base station. The apparatus 1102/1102' may also include means for deactivating the quiet interval in the absence of receiving, within a period of time, a request indicating a smaller maximum transmission power than a transmission power of the base station.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 13:
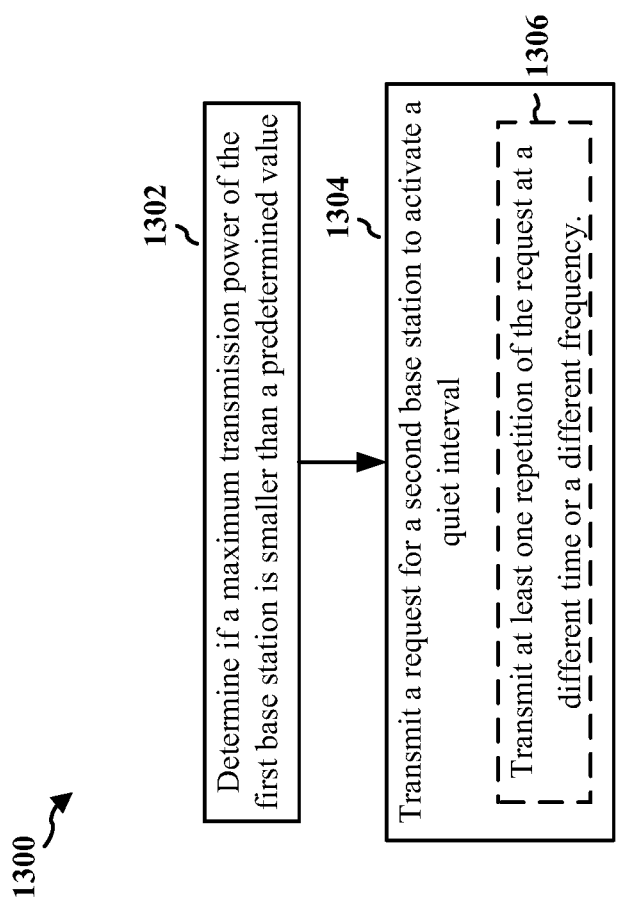
FIG. 13 is a flowchart of a method of wireless communication performed by another base station (with smaller Tx power).

FIG. 13 is a flowchart 1300 of a method of wireless communication. The method may be performed by a first base station operating in an unlicensed spectrum (e.g. the base station 102/180, 310, 504, 604, 904, 906, the apparatus 1402/1402'; the processing system 1514, which may include the memory 376 and which may be the entire base station 310 or a component of the base station 310, such as the TX processor 316, the RX processor 370, and/or the controller/processor 375) which communicates with a second base station operating in an unlicensed spectrum (e.g., the base station 508, 602, 702, 704, 802, 902) and a UE (e.g. UE-1 502 and UE 910). Optional aspects are illustrated with a dashed line. The method improves the ability of the first base station to gain control over an unlicensed, shared transmission medium in NR-U by allowing the second base station (i.e. an interfering base station with large transmission power) to implement a quiet interval.

At 1302, the first base station determines if a maximum transmission power of the first base station is smaller than a predetermined value. For example, 1302 may be performed by power determination component 1406 from FIG. 14. For example, referring to FIG. 9, the base station 904 may be configured to transmit the request if its maximum Tx power is smaller than a predetermined value (e.g. 30 dBm, 36 dBm, etc.). This predetermined value may be, for example, predefined by the network operator or dynamically indicated by the network component 912.

At 1304, the first base station transmits a request for a second base station to activate a quiet interval. For example, 1304 may be performed by activation request component 1408 from FIG. 14. The request indicates the maximum transmission power of the first base station. The request may also be broadcast, multicast, or unicast. Access to the transmission medium by the base stations is gained using a contention window as discussed supra. For example, referring to FIG. 9, base station 904 may transmit an OTA Request 920 requesting nearby base stations to reduce interference by activating their own quiet intervals. The OTA Request includes the maximum transmission power of the sending base station. In one example, base station 904 may broadcast an OTA Request including its maximum Tx power to nearby base stations 902 and 906. The request may alternatively be multicast or unicast to specific base stations.

Finally, at 1306, the first base station transmits at least one repetition of the request at a different time or a different frequency. For example, 1306 may be performed by accumulation component 1410 from FIG. 14. For example, referring to FIG. 9, base station 904 may utilize time and frequency repetition to boost coverage of the OTA Request 920. For instance, base station 904 may boost coverage by accumulating extra bits in the time and/or frequency domain when transmitting the OTA Request. In such case, base station 904 would assume that receiving base stations (e.g. base stations 902 and 906) can decode the accumulated signal.

In one aspect, the request includes a sequence with an autocorrelation or cross-correlation property. For example, referring to FIG. 9, base station 904 may configure the OTA Request 920 to include a pseudo-noise (PN) sequence or a Zadoff-Chu (ZC) sequence to enable base station 902 to easily detect the OTA Request.

In another aspect, the request includes a security mechanism. The security mechanism may be a certificate, for example. Referring to FIG. 9, base stations 902 and 904 may be controlled by different network operators, and so base station 902 may not know the source of a broadcast OTA Request 920. The certificate or other security mechanism would therefore allow base station 902 to ascertain whether the OTA Request is valid to avoid unfairly depriving its UEs (e.g. UE 908) of service.

Figure 14:
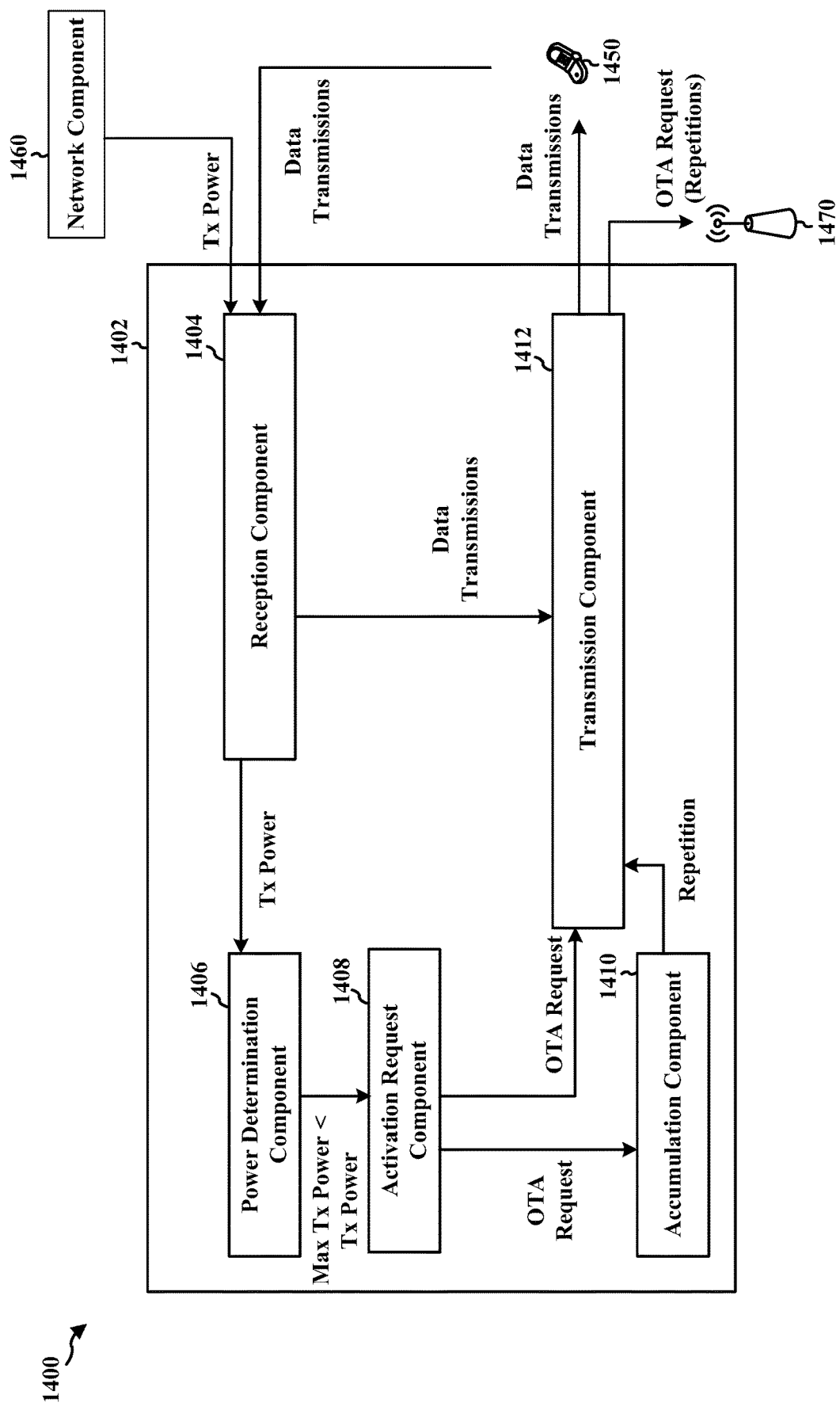
FIG. 14 is a conceptual data flow diagram illustrating the data flow between different means/components in an example base station apparatus.

FIG. 14 is a conceptual data flow diagram 1400 illustrating the data flow between different means/components in an example apparatus 1402. The apparatus may be a first base station (e.g. the base station 504, 604, 904, 906). The apparatus includes a reception component 1404 that receives uplink data transmissions from a UE 1450 (e.g. UE-1 502 and UE 910) and that may receive a dynamically indicated Tx Power from a network component 1460. The apparatus also includes a power determination component 1406 that determines if a maximum transmission power of the first base station is smaller than a predetermined value, e.g., a Tx power predefined by the network operator or dynamically indicated by the network component 1460, e.g., as described in connection with 1302 from FIG. 13. The apparatus further includes an activation request component 1408 that transmits, via a transmission component 1412, a request (e.g. an OTA Request) for a second base station 1470 (e.g. the base station 508, 602, 702, 704, 802, 902) to activate a quiet interval, e.g., as described in connection with 1304 from FIG. 13, where the request indicates the maximum transmission power of the first base station. The apparatus additionally includes an accumulation component 1410 that transmits, via the transmission component 1412, at least one repetition of the request (e.g. OTA Request) at a different time or a different frequency, e.g., as described in connection with 1306 from FIG. 13. The transmission component 1412 of the apparatus transmits downlink data transmissions to the UE 1450 and requests including repetitions of requests to the second base station 1470.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
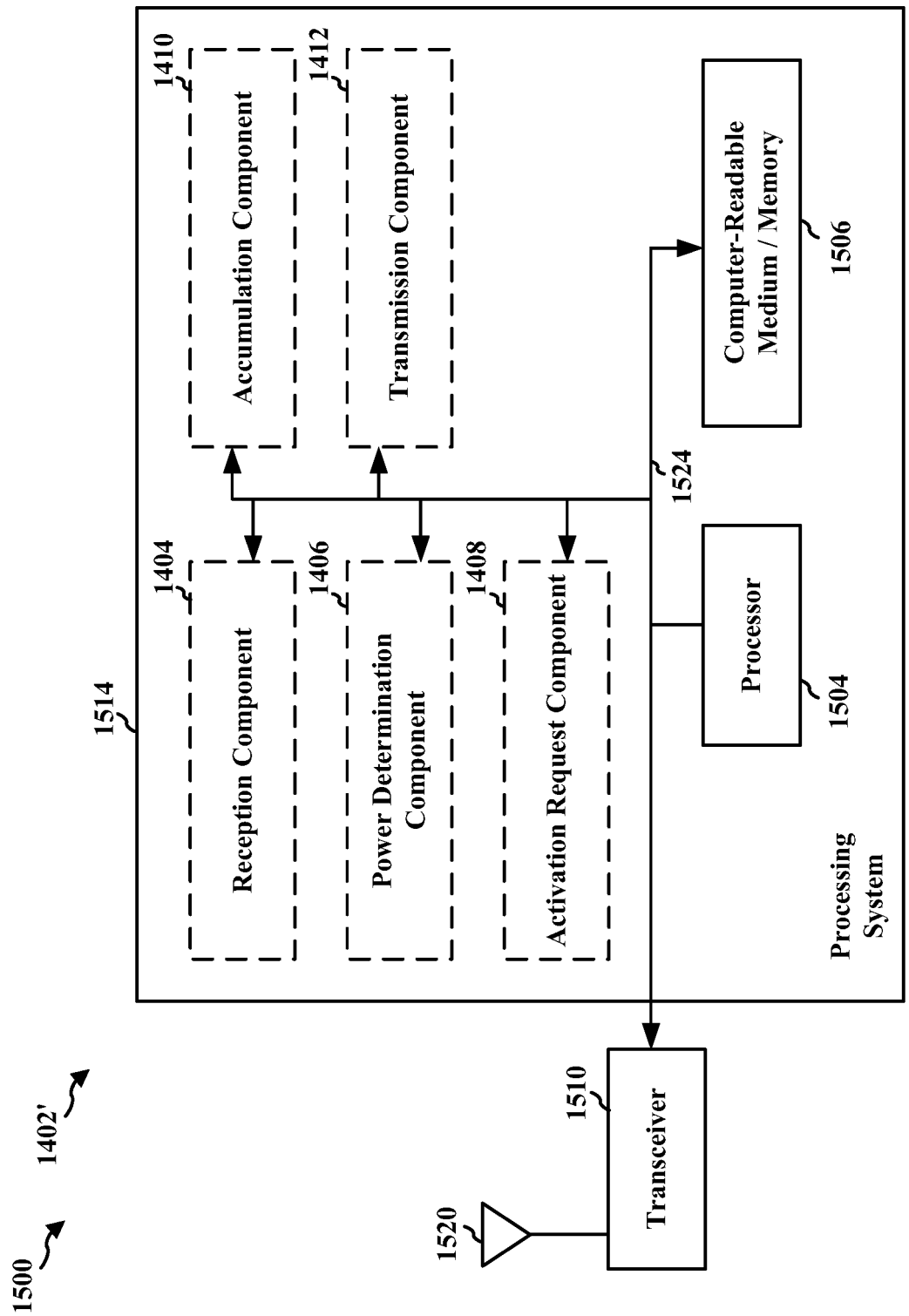
FIG. 15 is a diagram illustrating an example of a hardware implementation for a base station apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1412, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375. Alternatively, the processing system 1514 may be the entire base station (e.g., see 310 of FIG. 3).

In one configuration, the apparatus 1402/1402' for wireless communication includes means for determining if a maximum transmission power of the first base station is smaller than a predetermined value, and means for transmitting a request for a second base station to activate a quiet interval, where the request indicates the maximum transmission power of the first base station. In another configuration, the means for transmitting is configured to transmit at least one repetition of the request at a different time or a different frequency.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
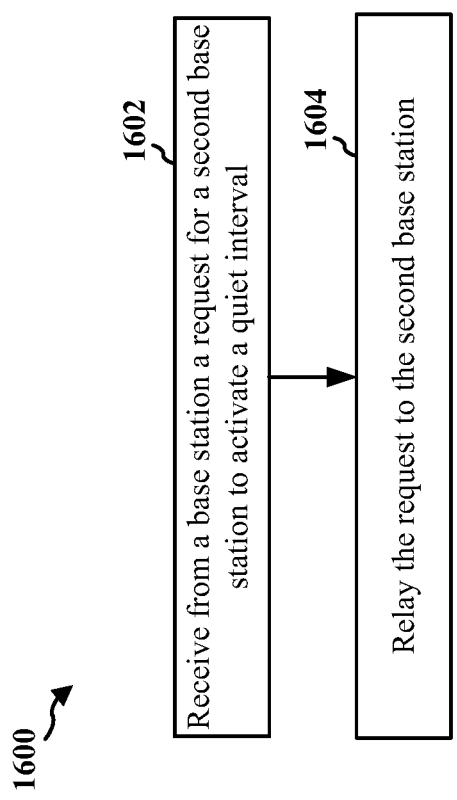
FIG. 16 is a flowchart of a method of wireless communication performed by a UE.

FIG. 16 is a flowchart 1600 of a method of wireless communication. The method may be performed by a UE (e.g. UEs 104, 350, 502, 506, 908, 910, the apparatus 1702/1702'; the processing system 1814, which may include the memory 360 and which may be the entire UE 350 or a component of the UE 350, such as the TX processor 368, the RX processor 356, and/or the controller/processor 359) which receives communications from a first base station operating in an unlicensed spectrum (e.g. the base station 504, 604, 904, 906) including requests for a second base station operating in an unlicensed spectrum (e.g., the base station 508, 602, 702, 704, 802, 902) to activate a quiet interval. The method improves the ability of a first base station to gain control over an unlicensed, shared transmission medium in NR-U by allowing a UE to relay a request to a second base station (i.e. an interfering base station with large transmission power) to implement a quiet interval.

At 1602, the UE receives from a base station a request for a second base station to activate a quiet interval. For example, 1602 may be performed by activation request relay component 1706 from FIG. 17. Access to the transmission medium by the base stations is gained using a contention window as discussed supra. For example, referring to FIG. 9, base station 906 may be suffering from interference from base station 902, but may not be able to directly send an OTA Request 930 to the base station due to geographical separation or other factors. Accordingly, base station 906 may identify one or more UEs which it serves that are closest to base station 902 (e.g. UE 910) and transmit the OTA Request to the UE requesting that it relay the request to the base station. Thus, base station 906 may broadcast, multicast, or unicast its OTA Request 930 to UE 910 to be relayed to base station 902.

Finally, at 1604, the UE relays the request to the second base station. For example, 1604 may be performed by relay component 1708 from FIG. 17. For example, referring to FIG. 9, after UE 910 receives the OTA Request 930 from base station 906, UE 910 relays the OTA Request to base station 902.

Figure 17:
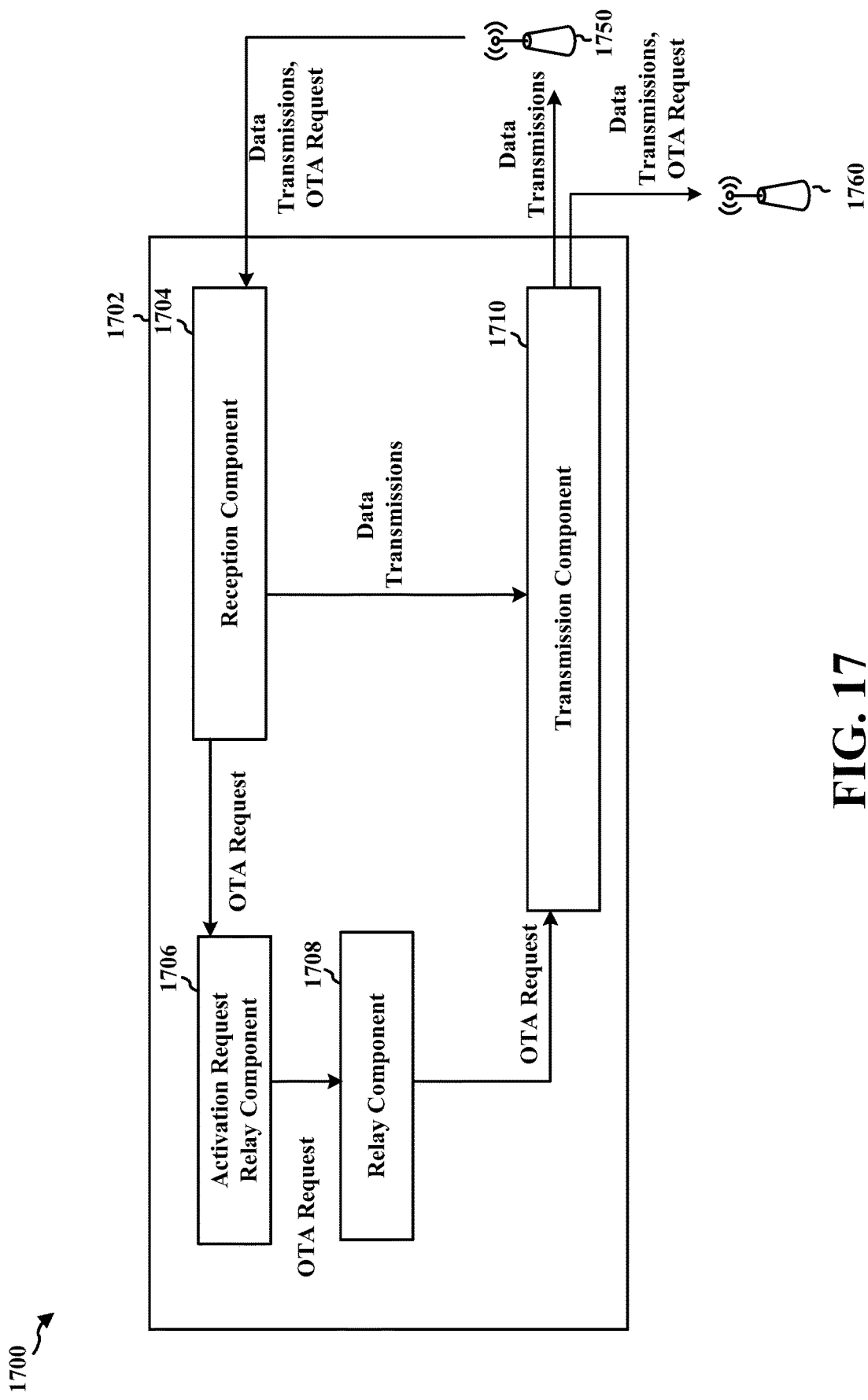
FIG. 17 is a conceptual data flow diagram illustrating the data flow between different means/components in an example UE apparatus.

FIG. 17 is a conceptual data flow diagram 1700 illustrating the data flow between different means/components in an example apparatus 1702. The apparatus may be a UE (e.g. UEs 502, 506, 908, 910). The apparatus includes a reception component 1704 that receives downlink data transmissions from a first base station 1750 (e.g. the base station 504, 604, 904, 906). The apparatus also includes an activation request relay component 1706 that receives from the first base station 1750, via the reception component 1704, a request (e.g. an OTA Request) for a second base station 1760 (e.g., the base station 508, 602, 702, 704, 802, 902) to activate a quiet interval, e.g., as described in connection with 1602 from FIG. 16. The apparatus further includes a relay component 1708 that relays the request to the second base station 1760 via a transmission component 1710, e.g., as described in connection with 1604 from FIG. 16. The transmission component 1710 transmits uplink data communications to the first base station 1750 and/or second base station 1760, and transmits the relayed OTA Request to the second base station 1760.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
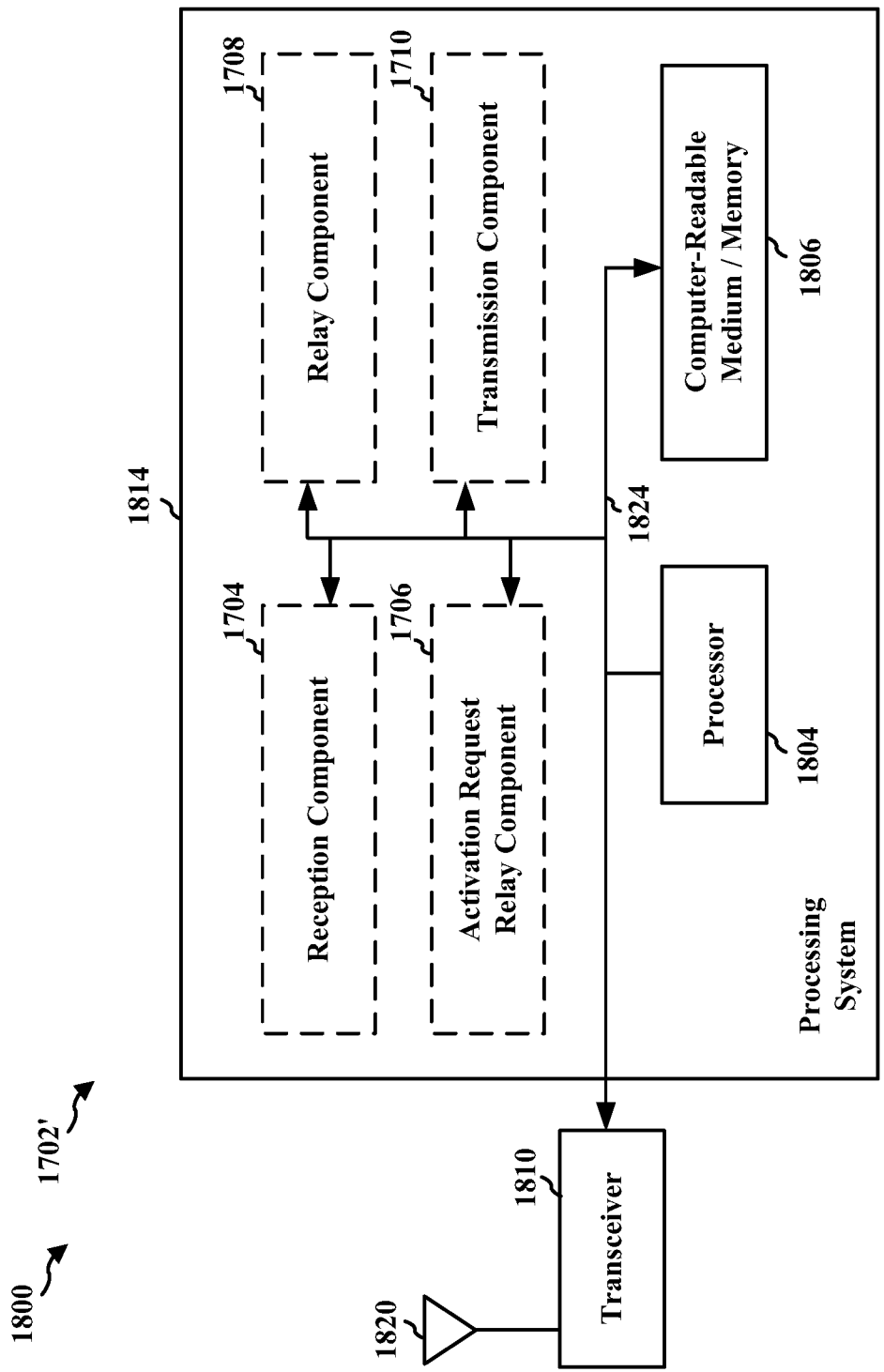
FIG. 18 is a diagram illustrating an example of a hardware implementation for a UE apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710 and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1710, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710. The components may be software components running in the processor 1804, resident/stored in the computer readable medium/memory 1806, one or more hardware components coupled to the processor 1804, or some combination thereof. The processing system 1814 may be a component of the UE 350 and may include the memory 360 and/or at least one of the TX processor 368, the RX processor 356, and the controller/processor 359. Alternatively, the processing system 1814 may be the entire UE (e.g., see 350 of FIG. 3).

In one configuration, the apparatus 1702/1702' for wireless communication includes means for receiving from a base station a request for a second base station to activate a quiet interval, and means for relaying the request to the second base station. The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Consequently, the present disclosure addresses the starvation effect in CSMA/CA-based channel access by implementing a periodic quiet interval during which base stations with large Tx power reduce their power or do not transmit (e.g. keep quiet) during periods of attempting to gain access to a transmission medium in NR-U. The base station may activate the quiet interval in response to an OTA signal from another base station having smaller Tx power. The base station may subsequently deactivate the quiet interval when no further OTA signals are received. The present disclosure thus ameliorates the starvation effect by allowing smaller power base stations greater opportunity to control the medium with greater QoS while maintaining BEB in NR-U.

To this end, the present disclosure is advantageous in that it allows larger power base stations to give up control of the medium or reduce interference with smaller power base stations who may be suffering from a starvation effect, by activating a quiet interval and transmitting on the transmission medium based on the quiet interval. The quiet interval may be flexibly implemented through reduced Tx power, off duty cycles, or periodic increase in CWmin, thus allowing ease of use while maintaining BEB in the CSMA/CA framework. The duration of the quiet interval can be configured to be dependent on Tx power (e.g. longer intervals for larger powers), band, location, carrier, and beam for flexible, country-wide as well as localized usage. Smaller power base stations may easily take advantage of this ability to improve QoS for their UEs by simply broadcasting an OTA Request identifying their maximum Tx power to nearby base stations and requesting to activate their quiet intervals for a period of time. Problems with directly transmitting an OTA Request to the larger power base station can be resolved by relaying UEs. Moreover, to promote fairness with the UEs served by larger power base stations, these base stations can choose to activate their quiet interval if their Tx power is larger than the maximum power identified in the request, and deactivate their quiet interval if no further requests meeting this power condition are received.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station operating in an unlicensed spectrum, the method comprising:
    receiving a request from a second base station to activate a quiet interval, wherein the request includes a maximum transmission power of the second base station;
    determining when a transmission power of the base station is larger than the maximum transmission power of the second base station;
    activating the quiet interval at a periodic interval in the unlicensed spectrum when the transmission power of the base station is larger than the maximum transmission power of the second base station, wherein activating the quiet interval includes increasing a minimum value of a contention window for binary exponential backoff (BEB) associated with Carrier Sense Multiple Access with Collision Avoidance (CSMA/CA); and transmitting on a transmission medium based on the quiet interval, wherein access to the transmission medium is gained using the contention window.

2. The method of claim 1, further comprising:
reducing a transmission power during the quiet interval.

3. The method of claim 1, wherein the base station does not transmit during the quiet interval.

4. The method of claim 1, wherein a duration of the quiet interval depends on a transmission power of the base station.

5. The method of claim 1, wherein a duration of the quiet interval is based on a band where the transmission medium is located.

6. The method of claim 1, wherein a duration of the quiet interval depends on a physical location of the base station.

7. The method of claim 1, wherein the transmission medium comprises multiple carriers, wherein an independent quiet interval is configured for each carrier.

8. The method of claim 1, wherein the transmission medium comprises multiple beams and an independent quiet interval is configured for each beam.

9. The method of claim 1, wherein the request is broadcast.

10. A method of wireless communication at a base station operating in an unlicensed spectrum, the method comprising:
receiving a request from a second base station to activate a quiet interval, wherein the request includes a maximum transmission power of the second base station;
determining when a transmission power of the base station is larger than the maximum transmission power of the second base station;
activating, when the transmission power of the base station is larger than the maximum transmission power of the second base station, the quiet interval at a periodic interval in the unlicensed spectrum for a plurality of transmit opportunities (TxOP) for a predetermined delay after receiving the request; and
transmitting on a transmission medium based on the quiet interval, wherein access to the transmission medium is gained using a contention window.

11. The method of claim 1, wherein the request includes a sequence with an autocorrelation or cross-correlation property.

12. The method of claim 1, wherein the request includes a security mechanism.

13. A method of wireless communication at a base station operating in an unlicensed spectrum, the method comprising:
receiving a request from a second base station to activate a quiet interval, wherein the request includes a maximum transmission power of the second base station;
determining when a transmission power of the base station is larger than the maximum transmission power of a second base station;
activating the quiet interval at a periodic interval in the unlicensed spectrum when the transmission power of the base station is larger than the maximum transmission power of the second base station;
transmitting on a transmission medium based on the quiet interval, wherein access to the transmission medium is gained using a contention window; and
deactivating the quiet interval in the absence of receiving, within a period of time, a request indicating a smaller maximum transmission power than a transmission power of the base station.

14. An apparatus for wireless communication, wherein the apparatus is a base station operating in an unlicensed spectrum, the apparatus comprising:
a memory; and
at least one processor coupled to the memory and configured to:
receive a request from a second base station to activate a quiet interval, wherein the request includes a maximum transmission power of the second base station; and
determine when a transmission power of the base station is larger than the maximum transmission power of the second base station;
activate, when the transmission power of the base station is larger than the maximum transmission power of the second base station, the quiet interval at a periodic interval in the unlicensed spectrum by increasing a minimum value of a contention window for binary exponential backoff (BEB) associated with Carrier Sense Multiple Access with Collision Avoidance (CSMA/CA); and
transmit on a transmission medium based on the quiet interval, wherein access to the transmission medium is gained using the contention window.

15. The apparatus of claim 14, wherein the at least one processor is further configured to:
reduce a transmission power during the quiet interval.

16. The apparatus of claim 14, wherein the base station does not transmit during the quiet interval.

17. The apparatus of claim 14, wherein a duration of the quiet interval depends on a transmission power of the base station.

18. The apparatus of claim 14, wherein the request is broadcast.

19. An apparatus for wireless communication, wherein the apparatus is a base station operating in an unlicensed spectrum, the apparatus comprising:
a memory; and
at least one processor coupled to the memory and configured to:
receive a request from a second base station to activate a quiet interval, wherein the request includes a maximum transmission power of the second base station; and
determine when a transmission power of the base station is larger than the maximum transmission power of the second base station;
activate, when the transmission power of the base station is larger than the maximum transmission power of the second base station, the quiet interval at a periodic interval in the unlicensed spectrum for a plurality of transmit opportunities (TxOP) for a predetermined delay after receiving the request; and
transmit on a transmission medium based on the quiet interval, wherein access to the transmission medium is gained using a contention window.

20. An apparatus for wireless communication, wherein the apparatus is a base station operating in an unlicensed spectrum, the apparatus comprising:
a memory; and
at least one processor coupled to the memory and configured to:
receive a request from a second base station to activate a quiet interval, wherein the request includes a maximum transmission power of the second base station;

determine when a transmission power of the base station is larger than the maximum transmission power of the second base station;
activate the quiet interval at a periodic interval in the unlicensed spectrum when the transmission power of the base station is larger than the maximum transmission power of the second base station;
transmit on a transmission medium based on the quiet interval, wherein access to the transmission medium is gained using a contention window; and
deactivate the quiet interval in the absence of receiving, within a period of time, a request indicating a smaller maximum transmission power than a transmission power of the base station.

* * * * *